(12) United States Patent
Wang et al.

(10) Patent No.: US 10,716,084 B2
(45) Date of Patent: Jul. 14, 2020

(54) NARROWBAND POSITIONING SIGNAL DESIGN AND PROCEDURES

(71) Applicant: QUALCOMM Incorporated, San Diego, CA (US)

(72) Inventors: Renqiu Wang, San Diego, CA (US); Hao Xu, San Diego, CA (US); Wanshi Chen, San Diego, CA (US); Xiao Feng Wang, San Diego, CA (US); Peter Gaal, San Diego, CA (US); Alberto Rico Alvarino, San Diego, CA (US); Juan Montojo, San Diego, CA (US); Jing Lei, San Diego, CA (US); Seyed Ali Akbar Fakoorian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/493,247

(22) Filed: Apr. 21, 2017

(65) Prior Publication Data

US 2017/0339658 A1 Nov. 23, 2017

Related U.S. Application Data

(60) Provisional application No. 62/338,475, filed on May 18, 2016.

(51) Int. Cl.
*H04W 24/00* (2009.01)
*H04W 64/00* (2009.01)
(Continued)

(52) U.S. Cl.
CPC ............ *H04W 64/00* (2013.01); *G01S 5/021* (2013.01); *G01S 5/0236* (2013.01); *H04L 5/0048* (2013.01)

(58) Field of Classification Search
CPC ... H04W 84/047; H04W 88/04; H04W 64/00; H04W 24/02
(Continued)

(56) References Cited

U.S. PATENT DOCUMENTS 8,571,146 B1\* 10/2013 Eliaz ................. H04L 25/03178
375/340
2005/0263146 A1\* 12/2005 Oono .................... F02D 41/222
123/690
(Continued)

FOREIGN PATENT DOCUMENTS

CN 101772157 A 7/2010
CN 102823308 A 12/2012
(Continued)

OTHER PUBLICATIONS

3GPP: "3rd Generation Partnership Project; Technical Specification Group Radio Access Network; Study on indoor positioning enhancements for UTRA and LTE (Release 13)", 3GPP Draft; DRAFT37857-D10, 3rd Generation Partnership Project (3GPP), Mobile Competence Centre ; 650, Route Des Lucioles ; F-06921 Sophia-Antipolis Cedex; France, Dec. 15, 2015 (Dec. 15, 2015), pp. 1-82, XP051063636, Retrieved from the Internet: URL: http://www.3gpp.org/ftp/tsg_ran/WG1_RL1/Draft/ [retrieved on Dec. 15, 2015].
(Continued)

*Primary Examiner* — Joseph Arevalo
(74) *Attorney, Agent, or Firm* — Steven R. Thiel; Patterson & Sheridan LLP

(57) ABSTRACT

Certain aspects of the present disclosure generally relate to downlink (DL) based and uplink (UL) based positioning reference signal (PRS) techniques that may help facilitate positioning procedures in systems deploying narrowband devices, such as narrowband Internet of Things (NB-IoT) devices. An exemplary method that may be performed by a node includes monitoring for positioning reference signals
(Continued)

(PRS) transmitted from one or more base stations within a narrowband region of a wider system bandwidth, wherein tones of the PRS are repeated across at least one of multiple symbols within a same subframe, or multiple consecutive subframes, and estimating timing from the one or more base stations based on the PRS.

40 Claims, 16 Drawing Sheets

(51) Int. Cl.
*G01S 5/02* (2010.01)
*H04L 5/00* (2006.01)

(58) Field of Classification Search
USPC .......... 455/452.1, 456.1, 570; 370/241, 329, 370/344
See application file for complete search history.

(56) References Cited

U.S. PATENT DOCUMENTS

| | | | | |
|---|---|---|---|---|
| 2005/0286619 | A1* | 12/2005 | Haddadin | H04B 1/0003 375/222 |
| 2009/0121758 | A1* | 5/2009 | Su | H03L 7/14 327/156 |
| 2010/0315291 | A1* | 12/2010 | Rakijas | G01S 5/0009 342/387 |
| 2011/0124347 | A1 | 5/2011 | Chen et al. | |
| 2012/0093122 | A1 | 4/2012 | Dai et al. | |
| 2013/0336193 | A1 | 12/2013 | Luo et al. | |
| 2016/0291128 | A1 | 10/2016 | Persson et al. | |
| 2016/0302094 | A1 | 10/2016 | Yum et al. | |

FOREIGN PATENT DOCUMENTS

| | | |
|---|---|---|
| CN | 102892196 A | 1/2013 |
| CN | 103609177 A | 2/2014 |
| CN | 104144485 A | 11/2014 |
| WO | WO-2013192160 | 12/2013 |
| WO | WO-2015117034 A3 | 9/2015 |
| WO | WO-2016159716 A1 | 10/2016 |
| WO | WO-2016162779 A1 | 10/2016 |
| WO | WO-2017029213 A1 | 2/2017 |

OTHER PUBLICATIONS

Ericsson, "Text Proposal and Discussion on Further Enhancements for OTDOA," 3GPP TSG RAN WG1 Meeting #82, R1-153744, Beijing, China, Aug. 24-28, 2015, 9 pgs., XP051001192, 3rd Generation Partnership Project.

Fischer S., "Observed Time Difference of Arrival (OTDOA) Positioning in 3GPP LTE", Jun. 6, 2014 (Jun. 6, 2014), 62 Pages, XP055284784, Retrieved from the Internet: URL: http://www.terranautx.com/s/Qualcomm-OTDOA-positioning-in-LTE-June-2014.pdf.

International Search Report and Written Opinion—PCT/US2017/029017—ISA/EPO—dated Aug. 2, 2017.

QUALCOMM Incorporated: "Introduction of PRS based Terrestrial Beacon System", 3GPP Draft; R1-164450 (PRS Based Terrestrial Beacon System), 3rd Generation Partnership Project (3GPP), Mobile Competence Centre ; 650, Route Des Lucioles ; F-06921 Sophia-Antipolis Cedex; France vol. Ran WG1, No. Nanjing. China; May 23, 2016-May 27, 2016, May 14, 2016 (May 14, 2016), pp. 1-9, XP051096442, Retrieved from the Internet: URL: http://www.3gpp.org/ftp/tsg_ran/WG1_RL1/TSGR1_85/Docs/[retrieved on May 14, 2016] the whole document.

Wang Y.P.E., et al., "A Primer on 3GPP Narrowband Internetof Things (NB-IoT)", Jun. 2016, pp. 1-8.

* cited by examiner

NARROWBAND POSITIONING SIGNAL DESIGN AND PROCEDURES

CROSS-REFERENCE TO RELATED APPLICATIONS

The present application for patent claims priority to U.S. Provisional Application No. 62/338,475, filed May 18, 2016, which is assigned to the assignee of the present application and hereby expressly incorporated by reference herein in its entirety.

BACKGROUND

Field of the Invention

Certain aspects of the present disclosure generally relate to wireless communications and more specifically to positioning in wireless communications systems that utilize narrowband regions of wider system bandwidth.

Description of Related Art

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE) including LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices may include user equipments (UEs). Some UEs may be considered machine type communication (MTC) UEs, which may include remote devices, that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example.

In some cases devices, such as MTC and other types of devices, may communicate using a narrowband (NB) region of wider system bandwidth. Utilizing a narrowband region may present challenges for various procedures, such as positioning procedures where positioning reference signals are used to track a location (and/or movement) of devices within a network.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Aspects of the present disclosure provide a method for wireless communications performed by a wireless node. The method generally includes monitoring for positioning reference signals (PRS) transmitted, from one or more base stations, within a narrowband region of wider system bandwidth and estimating timing from the one or more base stations based on the PRS.

Aspects of the present disclosure provide a method for wireless communications performed by a base station. The method generally includes monitoring for positioning reference signals (PRS) transmitted, from at least one wireless node, within a narrowband region of wider system bandwidth and estimating timing from the at least one wireless node based on the PRS.

Aspects of the present disclosure provide a method for wireless communications performed by a wireless node. The method generally includes determining resources within a narrowband region of wider system bandwidth for transmitting positioning reference signals (PRS) to one or more base stations and transmitting the PRS using the determined resources.

Aspects of the present disclosure provide a method for wireless communications performed by a base station. The method generally includes determining resources within a narrowband region of wider system bandwidth for transmitting downlink positioning reference signals (PRS) to one or more wireless nodes and transmitting the downlink PRS using the determined resources.

Aspects of the present disclosure provide a method for wireless communications performed by a wireless node. The method generally includes monitoring for positioning reference signals (PRS) transmitted, from one or more base stations, across a plurality of narrowband regions within a wider system bandwidth and estimating at least one of downlink timing or relative location of the wireless node based on the PRS.

Aspects of the present disclosure provide a method for wireless communications performed by a wireless node. The method generally includes determining resources in a plurality of narrowband regions within wider system bandwidth for transmitting positioning reference signals (PRS) to one or more base stations and transmitting the PRS using the determined resources.

Aspects of the present disclosure provide a method for wireless communications performed by a base station. The method generally includes monitoring for positioning reference signals (PRS) transmitted, from a wireless node, across a plurality of narrowband regions within a wider system bandwidth and estimating at least one of uplink timing or relative location of the wireless node based on the PRS.

Aspects of the present disclosure provide a method for wireless communications performed by a base station. The method generally includes determining resources in a plurality of narrowband regions within wider system bandwidth for transmitting positioning reference signals (PRS) to at least one wireless node and transmitting the PRS using the determined resources Numerous other aspects are provided including methods, apparatus, systems, computer program products, computer readable medium, and processing systems.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Aspects of the present disclosure provide techniques and apparatus for positioning for devices with limited communication resources, such as low cost (LC) machine type communication (MTC) devices, LC enhanced MTC (eMTC) devices, narrowband Internet of Things (IoT) devices, and the like. As will be described herein, positioning reference signals (PRS) may be transmitted by a wireless node (to one or more base stations) in one or more narrowband regions of overall system bandwidth for uplink-based PRS positioning. Similarly, narrowband PRS may be transmitted by one or more base stations, for downlink-based PRS positioning.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "network" and "system" are often used interchangeably. A CDMA network may implement a radio technology such as Universal Terrestrial Radio Access (UTRA), cdma2000, etc. UTRA includes Wideband-CDMA (W-CDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplex (FDD) and time division duplex (TDD), are releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). New radio (NR), which may also be referred to as 5G, is a set of enhancements to the LTE mobile standard promulgated by Third Generation Partnership Project (3GPP). The techniques described herein may be used for the wireless networks and radio technologies mentioned above as well as other wireless networks and radio technologies. For clarity, certain aspects of the techniques are described below for LTE/LTE-A, and LTE/LTE-A terminology is used in much of the description below. LTE and LTE-A are referred to generally as LTE.

Figure 1:
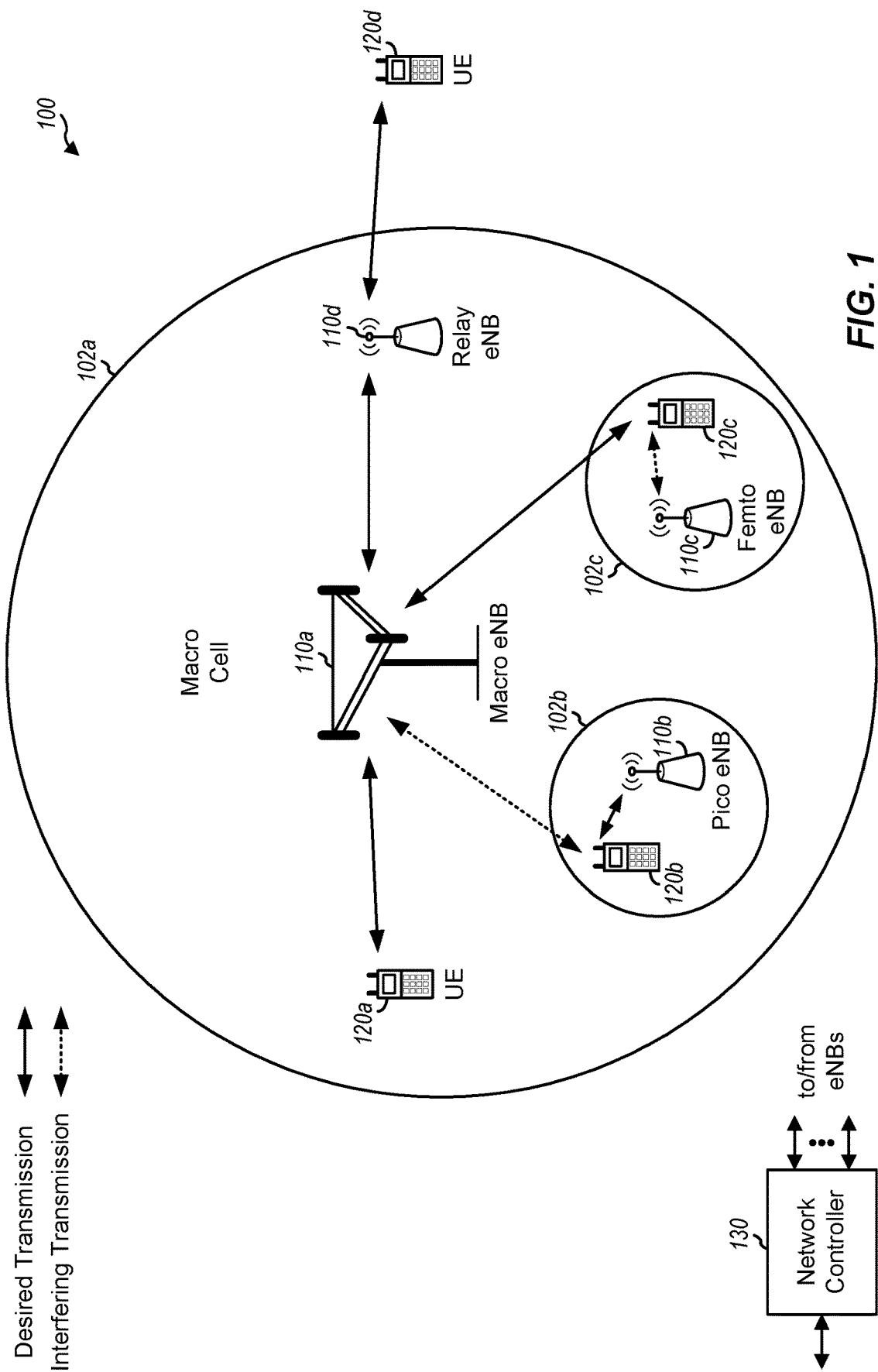
FIG. 1 is a block diagram conceptually illustrating an example wireless communication network, in accordance with certain aspects of the present disclosure.

FIG. 1 illustrates an example wireless communication network 100 with base stations (BSs) and user equipments (UEs), in which aspects of the present disclosure may be practiced.

For example, one or more paging procedure enhancements for certain UEs (e.g., LC MTC UEs, LC eMTC UEs, etc.) in the wireless communication network 100 may be supported. According to the techniques presented herein, the BSs and LC UE(s) in the wireless communication network 100 may be able to determine, from the available system bandwidth supported by the wireless communication network 100, which narrowband region(s) the LC UE(s) should monitor for a bundled paging message transmitted from the BSs in the wireless communication network 100. Also, according to techniques presented herein, the BSs and/or LC UE(s) in the wireless communication network 100 may be able to determine and/or adapt the bundling size for the paging message based on one or more triggers in the wireless communication network 100. A BS may be referred to as a Node B, eNodeB or eNB, gNB, access point (AP), radio head, TRP (transmit receive point, transmission reception point, etc.), new radio (NR) BS, 5G NB, etc.

The wireless communication network 100 may be an LTE network or some other wireless network. Wireless communication network 100 may include a number of evolved NodeBs (eNBs) 110 and other network entities. An eNB is an entity that communicates with user equipments (UEs) and may also be referred to as a base station, a Node B, an access point (AP), etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station," and "cell" may be used interchangeably herein.

Wireless communication network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay (station) eNB 110d may communicate with macro eNB 110a and a UE 120d in order to facilitate communication between eNB 110a and UE 120d. A relay station may also be referred to as a relay eNB, a relay base station, a relay, etc.

Wireless communication network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless communication network 100. For example, macro eNBs may have a high transmit power level (e.g., 5 to 40 W) whereas pico eNBs, femto eNBs, and relay eNBs may have lower transmit power levels (e.g., 0.1 to 2 W).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless communication network 100, and each UE may be stationary or mobile. A UE may also be referred to as an access terminal, a terminal, a mobile station (MS), a subscriber unit, a station (STA), etc. A UE may be a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, an ultrabook, navigation devices, gaming devices, cameras, a vehicular device, a drone, a robot/robotic device, a wearable device (e.g., smart watch, smart clothing, smart wristband, smart ring, smart bracelet, smart glasses, virtual reality goggles), a medical device, a healthcare device, etc. MTC UEs include devices such as sensors, meters, monitors, location tags, drones, trackers, robots/robotic devices, etc. UEs (e.g., MTC devices) may be implemented as Internet of Everything (IoE) or Internet of Things (IoT) (e.g., narrowband IoT (NB-IoT)) devices.

One or more UEs 120 in the wireless communication network 100 (e.g., an LTE network) may also be low cost (LC), low data rate devices, e.g., such as LC MTC UEs, LC eMTC UEs, etc. The LC UEs may co-exist with legacy and/or advanced UEs in the LTE network and may have one or more capabilities that are limited when compared to the other UEs (e.g., non-LC UEs) in the wireless network. For example, when compared to legacy and/or advanced UEs in the LTE network, the LC UEs may operate with one or more of the following: a reduction in maximum bandwidth (relative to legacy UEs), a single receive radio frequency (RF) chain, reduction of peak rate, reduction of transmit power, rank 1 transmission, half duplex operation, etc. As used herein, devices with limited communication resources, such as MTC devices, eMTC devices, etc. are referred to generally as LC UEs. Similarly, legacy devices, such as legacy and/or advanced UEs (e.g., in LTE) are referred to generally as non-LC UEs.

Figure 2:
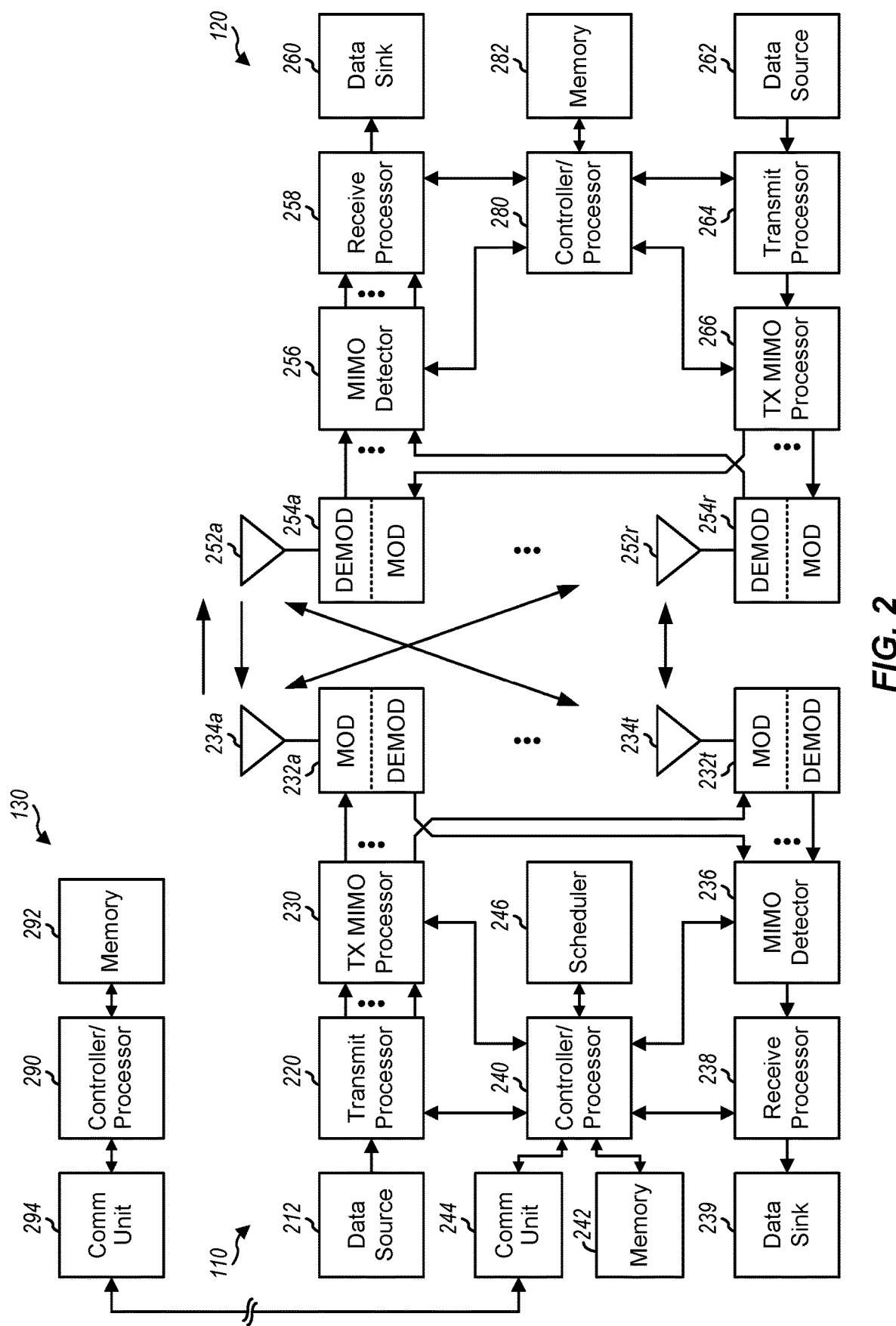
FIG. 2 is a block diagram conceptually illustrating an example of an evolved nodeB (eNB) in communication with a user equipment (UE) in a wireless communications network, in accordance with certain aspects of the present disclosure.

FIG. 2 is a block diagram of a design of BS/eNB 110 and UE 120, which may be one of the BSs/eNBs 110 and one of the UEs 120, respectively, in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCSs) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Processor 220 may also generate reference symbols for reference signals (e.g., the common reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each MOD 232 may process a respective output symbol stream (e.g., for OFDM, etc.) to obtain an output sample stream. Each MOD 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from BS 110 and/or other BSs and may provide received signals to demodulators (DEMODs) 254a through 254r, respectively. Each DEMOD 254 may condition (e.g., filter, amplify, downconvert, and digitize) its received signal to obtain input samples. Each DEMOD 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by MODs 254a through 254r (e.g., for SC-FDM, OFDM, etc.), and transmitted to BS 110. At BS 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

Controllers/processors 240 and 280 may direct the operation at BS 110 and UE 120, respectively. For example, controller/processor 240 and/or other processors and modules at BS 110 may perform or direct operations illustrated in FIGS. 10, 13, 14, 17 and/or other processes for the techniques described herein. Similarly, controller/processor 280 and/or other processors and modules at UE 120 may perform or direct operations illustrated in FIGS. 11, 12, 15, 16 and/or processes for the techniques described herein. Memories 242 and 282 may store data and program codes for BS 110 and UE 120, respectively. A scheduler 246 may schedule UEs for data transmission on the downlink and/or uplink.

Figure 3:
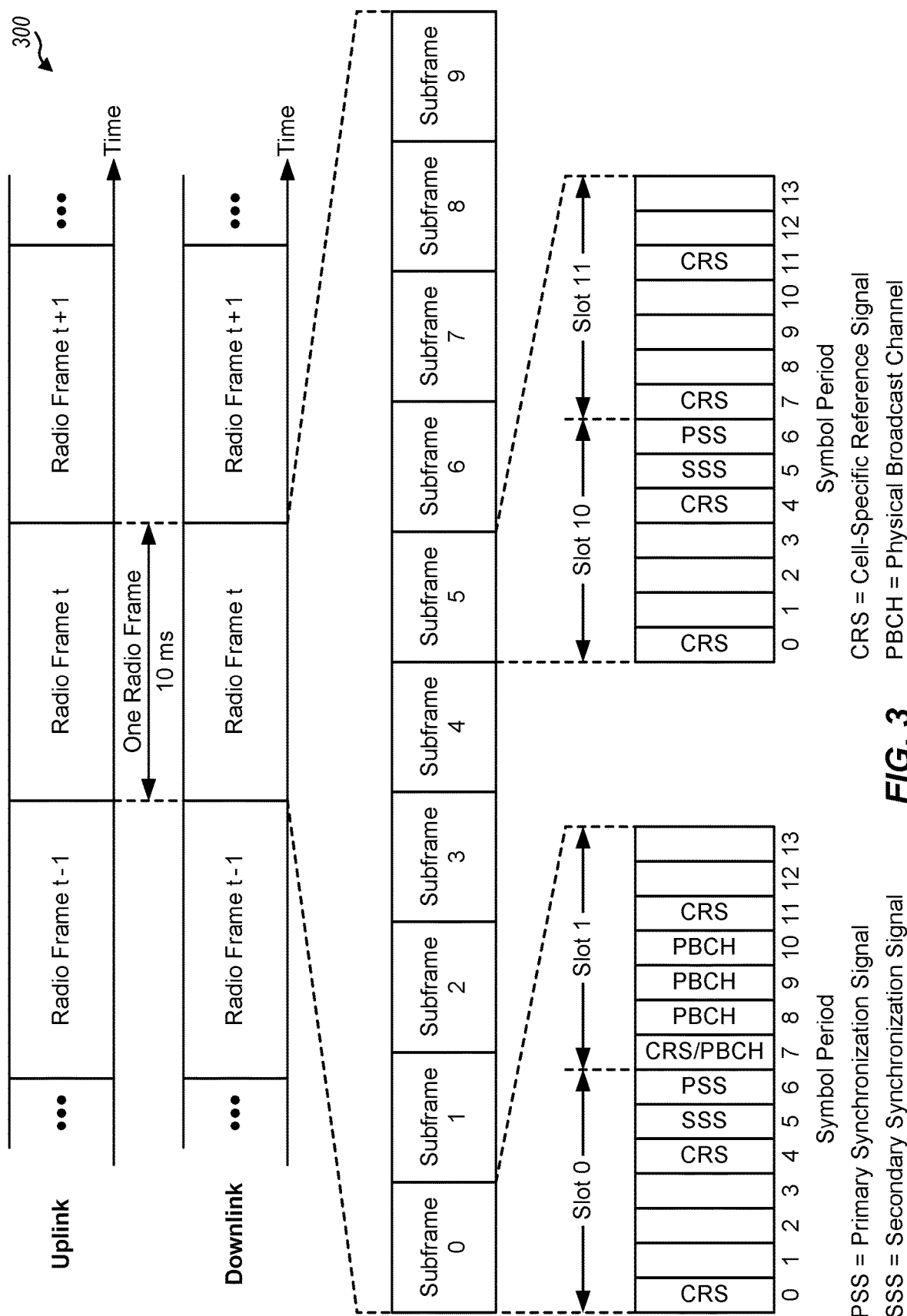
FIG. 3 is a block diagram conceptually illustrating an example frame structure for a particular radio access technology (RAT) for use in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

The PSS, SSS, CRS, and PBCH in LTE are described in 3GPP TS 36.211, entitled "Evolved Universal Terrestrial Radio Access (E-UTRA); Physical Channels and Modulation," which is publicly available.

Figure 4:
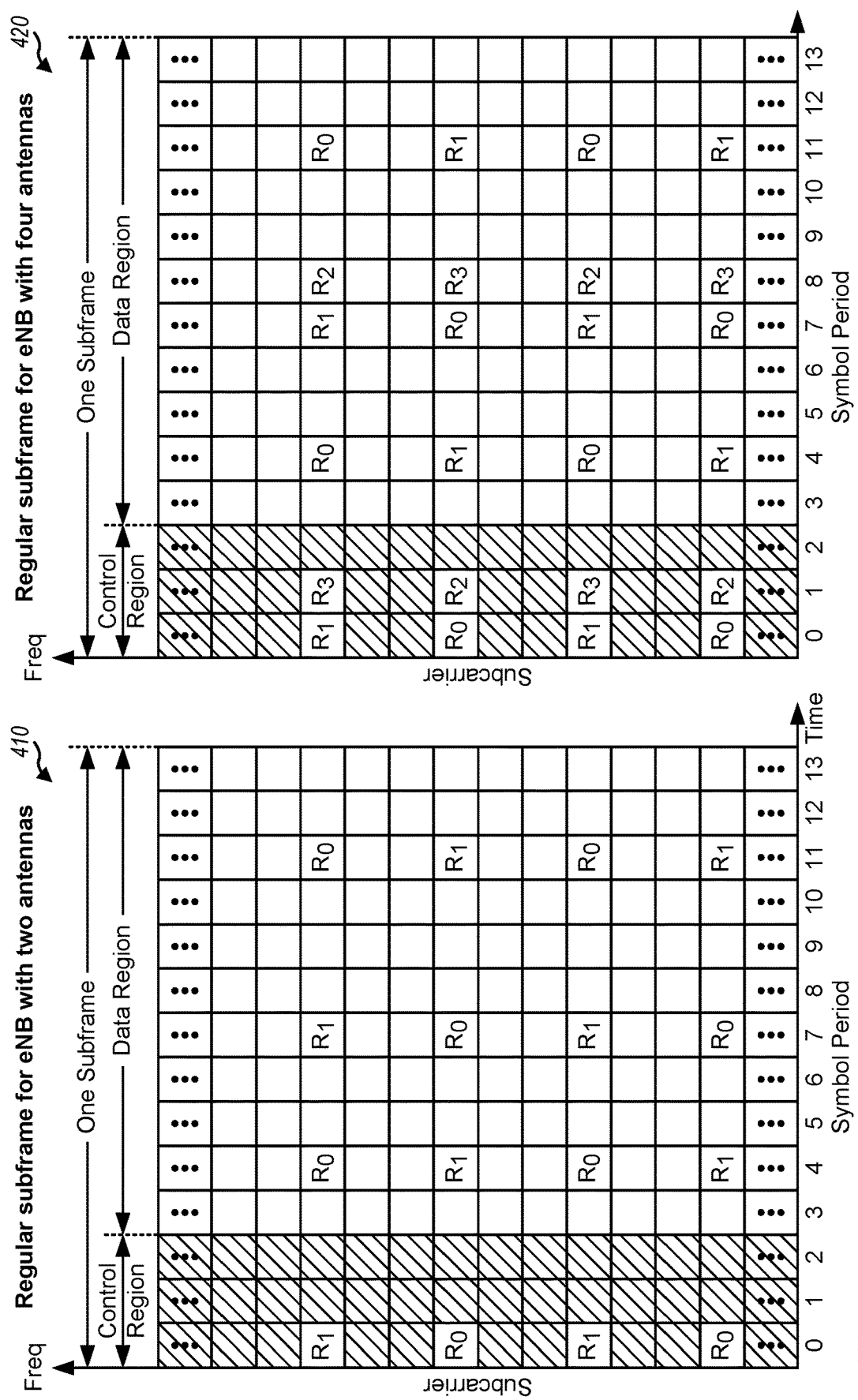
FIG. 4 illustrates example subframe formats for the downlink with a normal cyclic prefix, in accordance with certain aspects of the present disclosure.

FIG. 4 shows two example subframe formats 410 and 420 for the downlink with a normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7, and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., an eNB 110) may send one or more transmissions of a packet until the packet is decoded correctly by a receiver (e.g., a UE 120) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, path loss, etc. Received signal quality may be quantified by a signal-to-interference-plus-noise ratio (SINR), or a reference signal received quality (RSRQ), or some other metric. The UE may operate in a dominant interference scenario in which the UE may observe high interference from one or more interfering eNBs.

As mentioned above, one or more UEs in the wireless communication network (e.g., wireless communication network 100) may be devices that have limited communication resources, such as LC UEs, as compared to other (non-LC) devices in the wireless communication network.

In some systems, for example, in LTE Rel-13, the LC UE may be limited to a particular narrowband assignment (e.g., of no more than six resource blocks (RBs)) within the available system bandwidth. However, the LC UE may be able to re-tune (e.g., operate and/or camp) to different narrowband regions within the available system bandwidth of the LTE system, for example, in order to co-exist within the LTE system.

As another example of coexistence within the LTE system, LC UEs may be able to receive (with repetition) legacy physical broadcast channel (PBCH) (e.g., the LTE physical channel that, in general, carries parameters that may be used for initial access to the cell) and support one or more legacy physical random access channel (PRACH) formats. For example, the LC UE may be able to receive the legacy PBCH with one or more additional repetitions of the PBCH across multiple subframes. As another example, the LC UE may be able to transmit one or more repetitions of PRACH (e.g., with one or more PRACH formats supported) to an eNB in the LTE system. The PRACH may be used to identify the LC UE. Also, the number of repeated PRACH attempts may be configured by the eNB.

The LC UE may also be a link budget limited device and may operate in different modes of operation (e.g. entailing different amounts of repeated messages transmitted to or from the LC UE) based on its link budget limitation. For example, in some cases, the LC UE may operate in a normal coverage mode in which there is little to no repetition (e.g., the amount of repetition needed for the UE to successfully receive and/or transmit a message may be low or repetition may not even be needed). Alternatively, in some cases, the LC UE may operate in a coverage enhancement (CE) mode in which there may be high amounts of repetition. For example, for a 328 bit payload, a LC UE in CE mode may need 150 or more repetitions of the payload in order to successfully receive the payload.

In some cases, e.g., also for LTE Rel-13, the LC UE may have limited capabilities with respect to its reception of broadcast and unicast transmissions. For example, the maximum transport block (TB) size for a broadcast transmission received by the LC UE may be limited to 1000 bits. Additionally, in some cases, the LC UE may not be able to receive more than one unicast TB in a subframe. In some cases (e.g., for both the CE mode and normal mode described above), the LC UE may not be able to receive more than one broadcast TB in a subframe. Further, in some cases, the LC UE may not be able to receive both a unicast TB and a broadcast TB in a subframe.

For MTC, LC UEs that co-exist in the LTE system may also support new messages for certain procedures, such as paging, random access procedure, etc. (e.g., as opposed to conventional messages used in LTE for these procedures). In other words, these new messages for paging, random access procedure, etc. may be separate from the messages used for similar procedures associated with non-LC UEs. For example, as compared to conventional paging messages used in LTE, LC UEs may be able to monitor and/or receive paging messages that non-LC UEs may not be able to monitor and/or receive. Similarly, as compared to conventional random access response (RAR) messages used in a conventional random access procedure, LC UEs may be able to receive RAR messages that also may not be able to be received by non-LC UEs. The new paging and RAR messages associated with LC UEs may also be repeated one or more times (e.g., "bundled"). In addition, different numbers of repetitions (e.g., different bundling sizes) for the new messages may be supported.

Example Narrowband Coexistence within a Wideband System

Figure 5A:
FIGS. 5A and 5B illustrate an example of MTC coexistence within a wideband system, such as LTE, in accordance with certain aspects of the present disclosure.
Figure 5B:
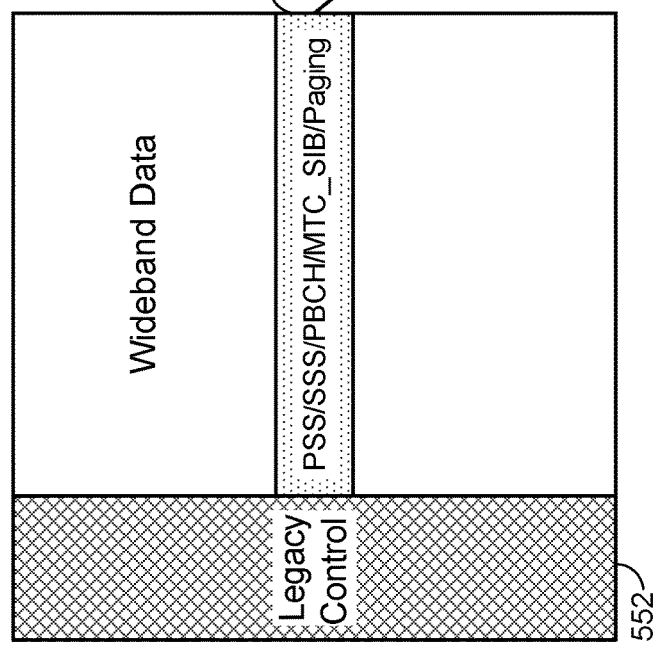

As mentioned above, narrowband (e.g., MTC or NB-IoT) operation may be supported in the wireless communication network (e.g., in coexistence with LTE or some other RAT). FIGS. 5A and 5B, for example, illustrate an example of how LC UEs in MTC operation may co-exist within a wideband system, such as LTE.

As illustrated in the example frame structure of FIG. 5A, subframes 510 associated with MTC and/or eMTC operation may be time division multiplexed (TDM) with regular subframes 520 associated with LTE (or some other RAT).

Additionally or alternatively, as illustrated in the example frame structure of FIG. 5B, one or more narrowband regions 560, 562 used by LC UEs in MTC may be frequency division multiplexed within the wider bandwidth 550 supported by LTE. Multiple narrowband regions, with each narrowband region spanning a bandwidth that is no greater than a total of 6 RBs, may be supported for MTC and/or eMTC operation. In some cases, each LC UE in MTC operation may operate within one narrowband region (e.g., at 1.4 MHz or 6 RBs) at a time. However, LC UEs in MTC operation, at any given time, may re-tune to other narrowband regions in the wider system bandwidth. In some examples, multiple LC UEs may be served by the same narrowband region. In other examples, multiple LC UEs may be served by different narrowband regions (e.g., with each narrowband region spanning 6 RBs). In yet other examples, different combinations of LC UEs may be served by one or more same narrowband regions and/or one or more different narrowband regions.

The LC UEs may operate (e.g., monitor/receive/transmit) within the narrowband regions for various different operations. For example, as shown in FIG. 5B, a first narrowband region 560 (e.g., spanning no more than 6 RBs of the wideband data) of a subframe 552 may be monitored by one or more LC UEs for either a PSS, SSS, PBCH, MTC signaling, or paging transmission from a BS in the wireless communication network. As also shown in FIG. 5B, a second narrowband region 562 (e.g., also spanning no more than 6 RBs of the wideband data) of a subframe 554 may be used by LC UEs to transmit a RACH or data previously configured in signaling received from a BS. In some cases, the second narrowband region may be utilized by the same LC UEs that utilized the first narrowband region (e.g., the LC UEs may have re-tuned to the second narrowband region to transmit after monitoring in the first narrowband region). In some cases (although not shown), the second narrowband region may be utilized by different LC UEs than the LC UEs that utilized the first narrowband region.

Although the examples described herein assume a narrowband of 6 RBs, those skilled in the art will recognize that the techniques presented herein may also be applied to different sizes of narrowband regions.

Example Narrowband Management for MTC

As mentioned above, in certain systems, e.g., such as LTE Rel-12, narrowband operation for MTC (e.g., eMTC) may be supported. A cell supporting narrowband operation for MTC may have different system bandwidths for downlink (DL) and uplink (UL) operations. A cell having different DL and UL system bandwidths (SBs) may organize the DL system bandwidth into narrowband regions in a manner different than the manner used to organize the UL system bandwidth into narrowband regions. Accordingly, aspects of the present disclosure provide techniques for organizing a DL system bandwidth and an UL system bandwidth into narrowband regions.

A cell supporting narrowband operation for MTC and legacy UEs may receive legacy PUCCH transmissions from the legacy UEs. Legacy PUCCH transmissions may be transmitted at either or both edges of a UL system bandwidth of a cell. Accordingly, aspects of the present disclosure provide techniques to reserve transmission resources included in an UL narrowband region for use by legacy PUCCH transmissions. Similar reservations may also be applied to a DL narrowband region for use by other legacy DL signals or channels.

A cell supporting narrowband operations for MTC may also support transmission of sounding reference signals (SRS). The current minimum defined bandwidth for transmission of SRS is four RBs. However, as mentioned above, the bandwidth of narrowband regions is six RBs. The fact that six RBs are not divisible by four RBs presents challenges in managing SRS transmissions using four RBs in six-RB based narrowband operations. Accordingly, aspects of the present disclosure provide techniques for assigning transmission resources for transmission of SRS in a cell supporting narrowband operations (e.g., for MTC).

A cell operating with FDD may have a DL system bandwidth that is of a different size than the UL system bandwidth of the cell. For example, a cell may perform DL operations in a system bandwidth of ten MHz and UL operations in a five MHz system bandwidth. To support MTC operations and MTC UEs, the cell may organize the DL system bandwidth and the UL system bandwidth into narrowband regions, or narrowband regions. An eNB or other BS controlling the cell may assign a DL narrowband region to a MTC UE for the MTC UE to monitor for signals from the eNB. Similarly, the eNB (or other BS) may assign a UL narrowband region to the MTC UE for the MTC to use when transmitting UL signals. In the example, the cell may organize the DL system bandwidth into eight DL narrowband regions while organizing the UL system bandwidth into four UL narrowband regions.

When a BS (e.g., an eNB or a cell) supports MTC UEs with the DL system bandwidth and UL system bandwidth of the cell organized into narrowband regions, the BS may establish a mapping between DL narrowband regions and UL narrowband regions, so that assigning a DL narrowband region to an MTC UE implies an assignment of a UL narrowband region to that MTC UE. Having a mapping allows the BS to simplify scheduling of resources in the cell, e.g., the BS can expect ACK/NAKs for transmissions on a DL narrowband region to an MTC UE on the corresponding UL narrowband region. Likewise, an MTC UE monitors for DL transmissions on the assigned DL narrowband region for the MTC UE and responds with transmissions on the corresponding UL narrowband region.

According to aspects of the present disclosure, a technique for mapping UL and DL narrowband regions by a BS is provided. A BS may determine a minimum size of the UL system bandwidth and the DL system bandwidth supported by the BS, determine a number of narrowband regions that can be organized in the determined size, and then organize both the DL system bandwidth and the UL system bandwidth in that number of narrowband regions. The BS may then map each DL narrowband region to one UL narrowband region. For example, a cell may perform DL operations in a system bandwidth of ten MHz and UL operations in a five MHz system bandwidth. In the example, the BS may determine that the minimum size of the UL system bandwidth and the DL system bandwidth is five MHz, and then determine that the BS can organize four narrowband regions in a five MHz system bandwidth. Still in the example, the BS may then organize four DL narrowband regions in the DL system bandwidth and four UL narrowband regions in the UL system bandwidth, and map each DL narrowband region to one UL narrowband region.

Figure 6:
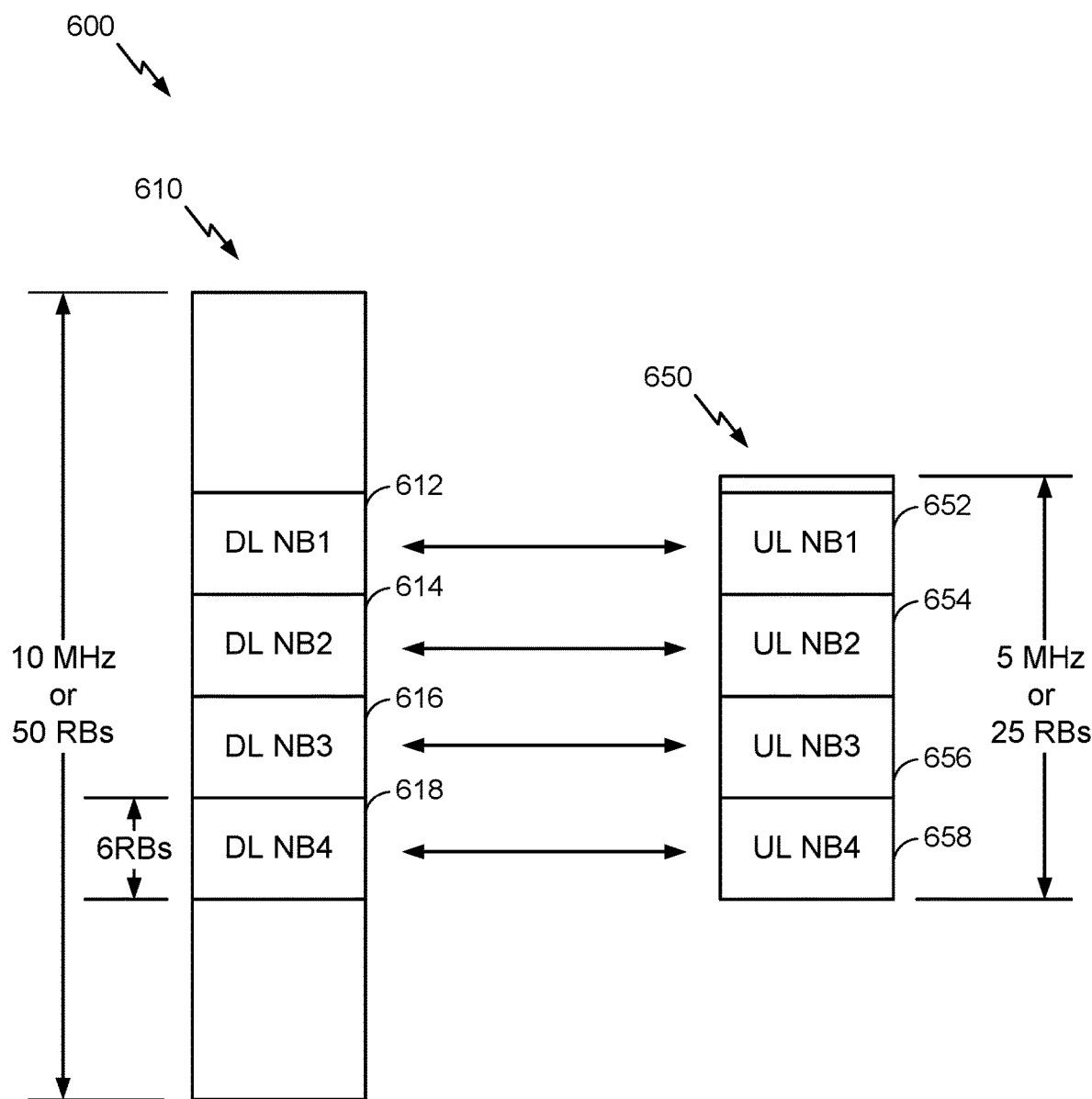
FIG. 6 illustrates an exemplary mapping of DL narrowband regions to UL narrowband regions, in accordance with certain aspects of the present disclosure.

FIG. 6 illustrates an exemplary mapping 600 of DL narrowband regions to UL narrowband regions, as described above. Such a mapping may be employed by eNB 110a in FIG. 1. While FIG. 6 shows the DL system bandwidth 610 and the UL system bandwidth 650 as apparently in the same frequency ranges, the DL system bandwidth and the UL system bandwidth are in different frequency ranges in a cell using FDD. DL system bandwidth 610 is ten MHz or fifty RBs wide, and UL system bandwidth 650 is five MHz or twenty-five RBs wide. A BS supporting MTC UEs while operating DL system bandwidth 610 and UL system bandwidth 650 may determine that the UL system bandwidth 650 is smaller than DL system bandwidth 610 (the 5 MHz size of UL system bandwidth 650 is the minimum size of the UL system bandwidth 650 and the DL system bandwidth 610). The BS may then determine that the BS can organize four narrowband regions 652, 654, 656, and 658 from the UL system bandwidth 650. The BS may then determine to organize four narrowband regions from the DL system bandwidth, and organize DL narrowband regions 612, 614, 616, and 618 from the DL system bandwidth. The BS may then map DL narrowband region 612 to UL narrowband region 652, DL narrowband region 614 to UL narrowband region 654, DL narrowband region 616 to UL narrowband region 656, and DL narrowband region 618 to UL narrowband region 658.

As mentioned above, LC MTC UEs were introduced in LTE Rel-12. Additional enhancements may be made in LTE Release 13 (Rel-13) to support MTC operations. For example, MTC UEs may be able to operate (e.g., monitor, transmit, and receive) in a narrowband region of 1.4 MHz or six RBs within wider system bandwidths (e.g., 1.4 MHz, 3 MHz, 5 MHz, 10 MHz, 15 MHz, 20 MHz). As a second example, base stations and MTC UEs may support coverage enhancements (CE) of up to 20 dB by some techniques, for example bundling. Coverage enhancement may also be referred to as coverage extension and range extension.

When a UE needs to connect with a cell to which the UE is not currently connected, the UE and the cell engage in an exchange of messages referred to as a random access channel (RACH) procedure. In a RACH procedure, a UE transmits a physical random access channel (PRACH) signal (sometimes referred to as Msg1 of a RACH procedure) in a set of transmission resources reserved for PRACH signals, then the cell responds to the PRACH signal with a random access response (RAR) message (sometimes referred to as Msg2 of a RACH procedure) carried on the downlink shared channel (DL-SCH). The UE responds to the RAR message with an RRC connection request message (sometimes referred to as Msg3 of a RACH procedure), and the cell responds with a contention resolution message (sometimes referred to as Msg4 of a RACH procedure). The UE is then connected with the cell.

In current (e.g., LTE Rel-12) wireless technologies, a PRACH signal transmitted by an MTC device comprises one group of 4 symbols in a single tone and using 2 hopping values.

As will be described in further details below, according to certain aspects of the present disclosure, a PRACH signal may be utilized in an uplink-based positioning procedure.

Narrowband Positioning Signal Design and Procedures

As described above, systems which deploy narrowband devices, such as MTC and NB-IoT devices, are challenged when performing positioning procedures. These challenges may arise from the limited frequency dimension (e.g., 1 RB system bandwidth of 200 kHz), multi-user capacity, and deep coverage in certain device deployments, and the possibility of supporting different coverage enhancement levels. In some cases, coverage enhancement of as much as 20 dB may be desirable, which may be achieved through long bundling (e.g., over multiple subframes, which impacts limited time resources). In addition, such systems may have a relatively large cell radius (e.g., as much as 35 km), resulting in long transmission delays (e.g., by as much as 200 μs).

Aspects of the present disclosure provide various mechanisms for positioning in systems that deploy narrowband devices. As will be described in greater detail below, such mechanisms may include downlink based positioning procedures (based on DL positioning reference signals or DL PRS), uplink based positioning procedures (based on UL PRS), and hybrid approaches (e.g., based on a combination of DL PRS and UL PRS).

In general, PRS signals may be transmitted within predefined bandwidth and according to a set of configuration parameters such as subframe offset, periodicity, and duration. Further, each cell of a network may apply a different muting pattern (defining times in which the cell does not transmit PRS) in an effort to avoid interference with PRS transmitted from other cells. PRS may be transmitted at pre-defined subframes and repeated (e.g., in several consecutive subframes that may be referred to as "positioning occasions"). The PRS itself may be based on any suitable known sequence (e.g., a Zadoff-Chu sequence). PRS from different cells may be multiplexed in the code domain (each cell transmitting a different (orthogonal) PRS sequence), in the frequency domain (e.g., at different frequency offsets), and/or in the time domain (e.g., using time-based blanking).

According to a DL-based positioning approach, one or more base stations may transmit PRS in one or more narrowband regions of a wider system bandwidth. A wireless node (e.g., a UE) may monitor for such DL PRS and perform timing and/or location estimation based on the DL PRS. The UE may estimate the location of the UE by obtaining positions of BSs from which the UE receives DL PRS and performing a trilateration procedure based on the positions of the BSs and the timing of the DL PRS. Additionally or alternatively, the UE may supply identifiers of BSs from which the UE receives DL PRS and timing information and/or those parameters to a location services (LCS) server, which may perform trilateration to estimate the location of the UE.

Figure 7:
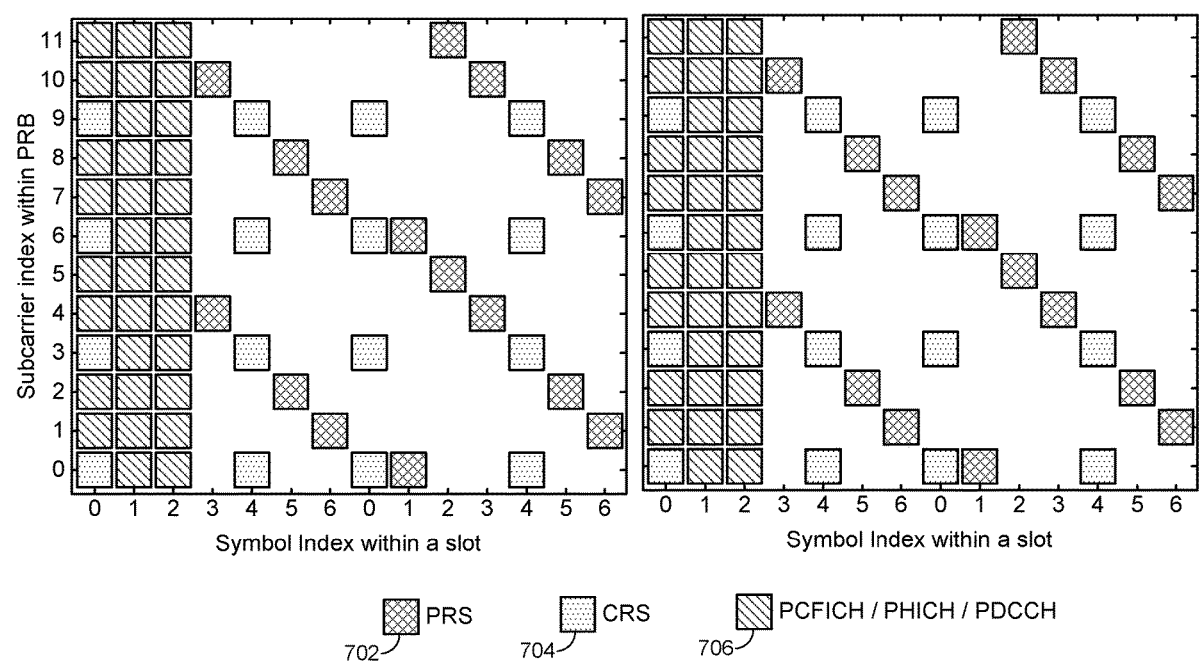
FIG. 7 illustrates example positioning reference signal (PRS) tones within a physical resource block (PRB), in accordance with certain aspects of the present disclosure.

As illustrated in FIG. 7, in some cases PRS 702 may be staggered (e.g., across symbols within a subframe and/or across PRS tones). In addition, PRS may be repeated (e.g., across multiple symbols within a same subframe or across multiple subframes). Staggering across multiple tones may provide frequency diversity and be suitable for wide-band operation involving IDFT based receivers. The PRS 702 may be located to avoid CRS 704 and resources 706 (e.g., the first three symbols) used for command signaling (e.g., PCFICH/PHICH/PDCCH).

Figure 8:
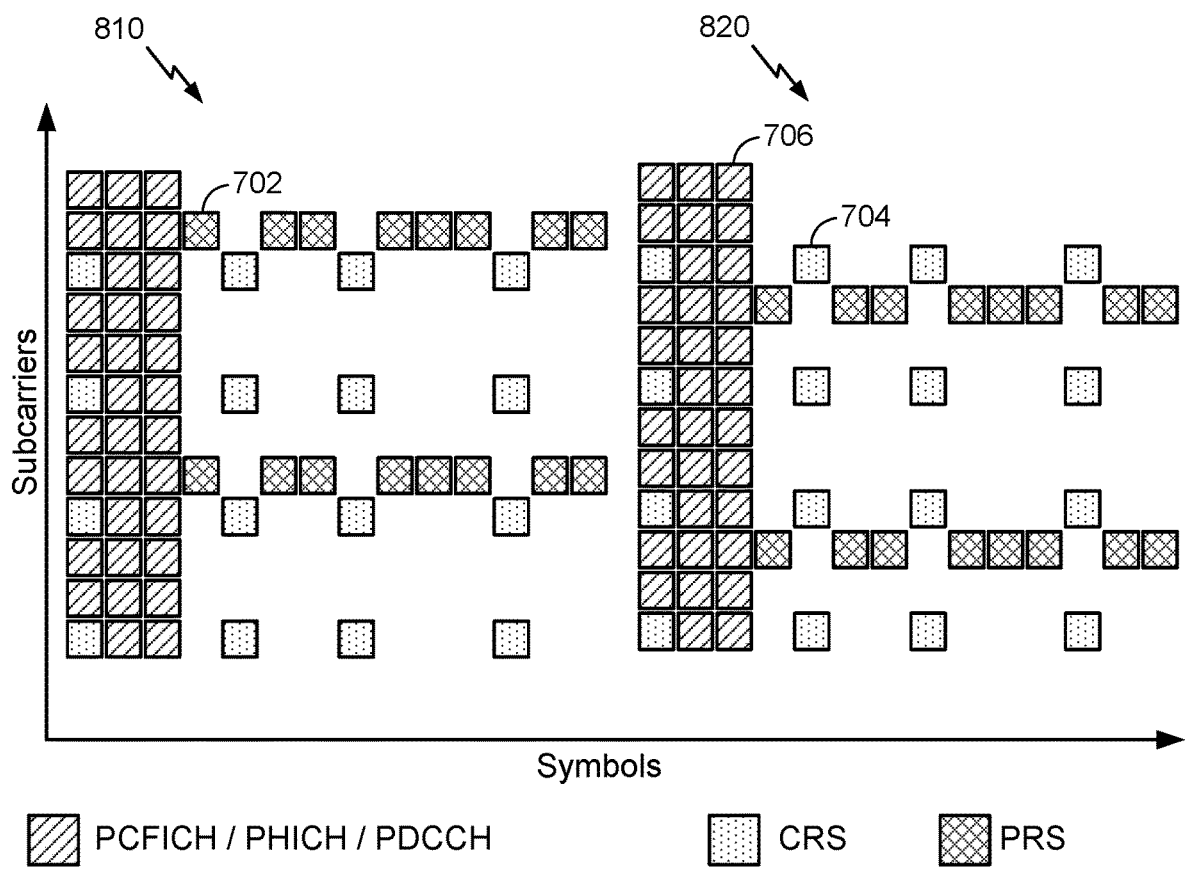
FIG. 8 illustrates example PRS tones within a PRB with hopping across subframes, in accordance with certain aspects of the present disclosure.

Repeating and/or staggering PRS within a single tone, as shown in FIG. 8, may allow for coherent combining of the PRS (providing additional gain). And the combination of the PRS may be done without estimating a frequency offset. The PRS may hop to a different PRS tone (e.g., a tone with a different tone index), for example, across time slots or across subframes. An example of PRS hopping from one tone to another tone across subframes may be seen by comparing the PRS at 810 with the PRS at 820.

Repeating and/or staggering PRS within a single tone may be particularly suitable for positioning procedures involving devices in deep coverage and/or phase-offset based receivers. For in-band deployment (e.g., where the narrowband regions are within system bandwidth used for wide-band communications), the cyclic prefix (CP) of the PRS may be the same as the CP used for wide-band communications (e.g., normal CP or extended CP). In some cases, CP may be limited by cell size (e.g., a cell of a given size requires a minimum CP for accurate decoding of signals within the cell).

For UL-PRS, in some cases, a physical random access channel (PRACH) like signal may be transmitted (e.g., within a single tone with 2 hopping values). In such cases, a single PRACH-like PRS transmission may be intended to reach multiple BSs. Because a UE is normally aligned to DL timing of a serving cell, the UE may transmit PRS based on this DL timing. PRS transmitted by a UE based DL timing of a serving cell of the UE might lead to a negative delay for the PRS in a base station of one or more neighboring cells (e.g., if the UE is closer to the BS of the neighboring cell than the BS of the serving cell, PRS from the UE will arrive early at the BS of the neighboring cell and appear to have a negative delay). One approach to account for this is to have BSs monitor to detect PRS having negative delay. Another approach is for a UE to delay PRS transmission by a certain amount, wherein the amount is selected so all desired BSs will experience positive delays when receiving the PRS from the UE and thus eliminating the need to check for PRS having negative delay.

In some cases, a PRACH-like signal used for positioning may have different parameters from a normal PRACH (e.g., CP length, Frequency band, tones, time, hopping values). In some cases, a BS (e.g., an eNB) may set 1 bit in a PDCCH scheduling a PRACH by a UE (e.g., a scheduled or commanded PRACH) in order to indicate to the UE that the PRACH is to be used for a positioning or PRS procedure, as opposed to a PRACH procedure. A UE may then detect this bit as set and act accordingly (e.g., delaying the UL transmission if used for PRS).

Figure 9:
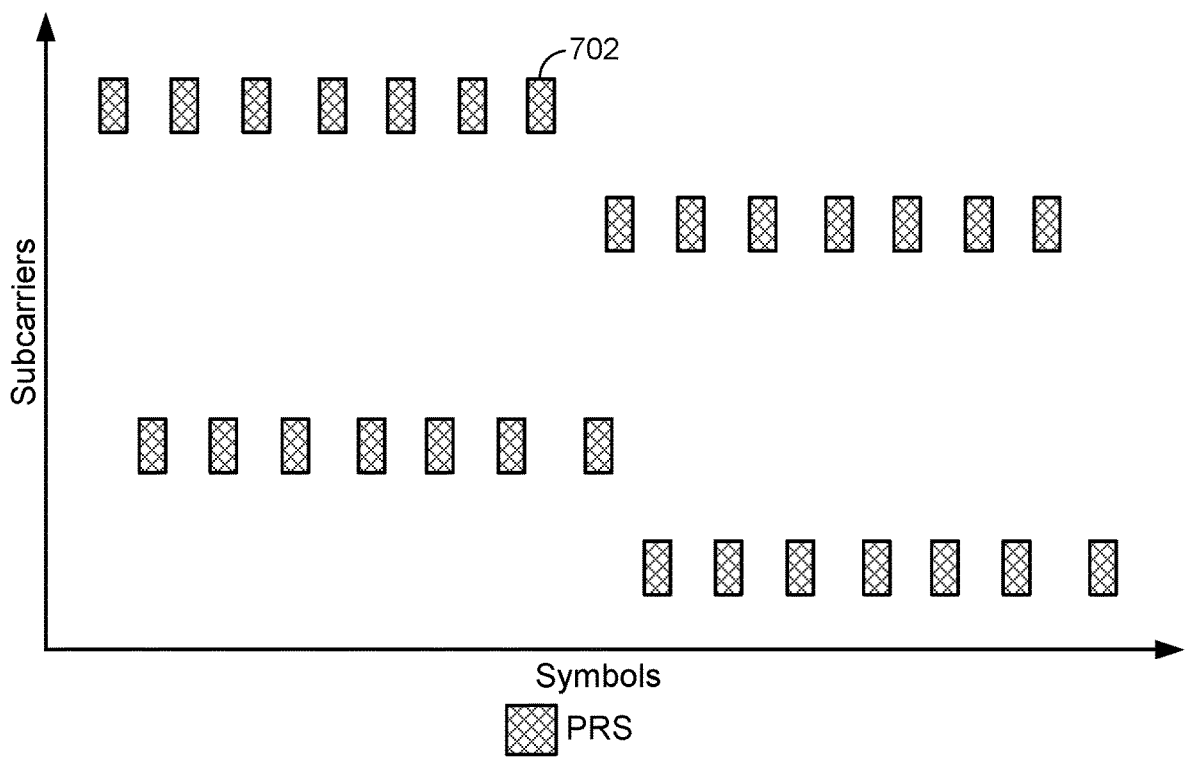
FIG. 9 illustrates example PRS with a single tone with hopping across subframes, in accordance with certain aspects of the present disclosure.

As illustrated in FIG. 9, in some cases UL PRS may be transmitted on a single tone with a fixed hopping value. In some cases, a different type of signal may be used for PRS, e.g., with different parameters from the PRACH-like signal described above (e.g., different CP length, different tone spacing, different number of hopping values or different hopping value). In some cases, a random hopping value may be used in addition to a fixed hopping value.

In some cases, one or more aspects of UL and/or DL PRS procedures may be cell dependent. For example, for a small cell size with synchronized eNBs, the distance to the most distant eNB may be within a CP for normal data, and PRS may be transmitted using the same CP length as the CP for normal data. As another example, a UE may first perform cell access, obtain a PRS configuration (for that cell) and at the same time, receive PRS from multiple cells, and perform timing and/or location estimation for the multiple cells.

According to aspects of the present disclosure, if a UE is in a connected mode, the UE may receive scheduling (e.g., an UL grant) for transmitting an UL PRS. In some cases, the UE may transmit UL PRS as a single tone with one hopping value (e.g., as illustrated in FIG. 9) to multiple cells. In such cases, the round-trip delay from the UE to the most distant BS (e.g., eNB) serving one of the multiple cells should be within the length of a CP of the UL PRS. In some cases, one hopping value may be determined based on cell size and/or CP size. In some cases, multiple BSs (e.g., eNBs) may estimate timing and/or location simultaneously based on UL PRS.

On the other hand, for large cell sizes and/or asynchronous cells (where BSs are not synchronized), a DL-based PRS procedure may be performed in stages. For example, in a first stage, the UE may acquire each cell based on PSS/SSS/PBCH. The UE may acquire PRS configuration and/or other information from each cell when the UE has acquired that cell. In a second stage, timing estimation may be performed by the UE based on DL PRS and using information (e.g., PRS configuration, timing information), if any, acquired from the cells, as described above. Of course, other cell signals having different CP lengths may cause inter-cell interference.

In some cases, an UL-based PRS procedure may also be performed in multiple stages. For example, in a first stage, a UE may send UL PRS as a single transmission to multiple BSs (if the cells of the BSs are small and/or synchronized) or multiple PRS transmissions, each to one or a few BSs, for BSs serving large and/or asynchronous cells. The UL PRS may be transmitted on a single tone with a fixed hopping value and/or using a random hopping value, as described above with reference to FIGS. 8-9. In a second stage, each BSs may perform timing estimation, based on the UL PRS directed to that BS.

In a hybrid PRS procedure, a combination of UL PRS and DL PRS may be used. For example, in a "DL-UL-DL" hybrid approach, a UE may get DL PRS from a serving cell and UL PRS configuration(s) for multiple cells. The UE may receive eNB scheduling for UL PRS and transmit UL PRS based on the UL PRS configuration(s) and as described above with reference to FIGS. 8-9. eNBs may then perform a rough DL timing offset estimation between eNBs. The UE may then receive one or more DL timing adjustments corresponding to one or more of the eNBs. For each cell, the UE may adjust DL timing (e.g., by applying the DL timing adjustments) and use the adjusted DL timing to perform a DL based PRS procedure.

In a "DL-DL-UL" hybrid approach, a UE may again get DL PRS from a serving cell and UL PRS configuration(s) for multiple neighbor cells. The UE may then use PSS/SSS to get DL timing offset estimates for BSs serving the multiple neighbor cells. For each neighbor cell, the UE may determine UL timing adjustments (TA) adjustments based on the DL timing offset for each neighbor cell. The UE may then transmit UL PRS based on the UL TA adjustments for each neighbor cell.

In some cases, PRS bandwidth may be expanded with hopping, for example, when there are multiple RBs available. In such cases, for DL-based PRS, the eNB may transmit PRS signals over multiple RBs (e.g., with the UE receiving PRS in one RB in each time period). The UE may retune a receiver to receive the PRS in the different RBs and then estimate a phase offset resulting from the retuning and compensate for the phase offset. The UE may concatenate the received PRS RBs together to effectively process a wider bandwidth of PRS signals. The UE may then use these enhanced (e.g., concatenated) PRS signals to estimate timing.

For UL-based PRS, a UE may transmit UL PRS at different tone and/or RB locations at different times (e.g., different symbols within a same subframe or across multiple subframes). In this case, an eNB may estimate a phase offset due to retuning (e.g., to receive the PRS in the different tone and/or RB locations) and compensate for the phase offset. In such cases, the eNB may concatenate multiple tones and/or RBs together to effectively process a wider bandwidth of PRS signals. In some cases, consecutive PRS subframes may be longer than legacy, may have a smaller periodicity, and/or may have more PRS subframes per period.

In addition, different eNBs may also use different RBs when transmitting DL PRS to avoid or reduce muting. In some cases, eNBs may reserve some RBs just for positioning (e.g. for transmission of PRS), with less or no normal data (e.g., PDSCH) scheduled for those RBs.

FIGS. 10-17 illustrate various operations for DL-based and UL-based PRS procedures from the base station (e.g., eNB) and wireless node (e.g., UE) perspectives.

Figure 10:
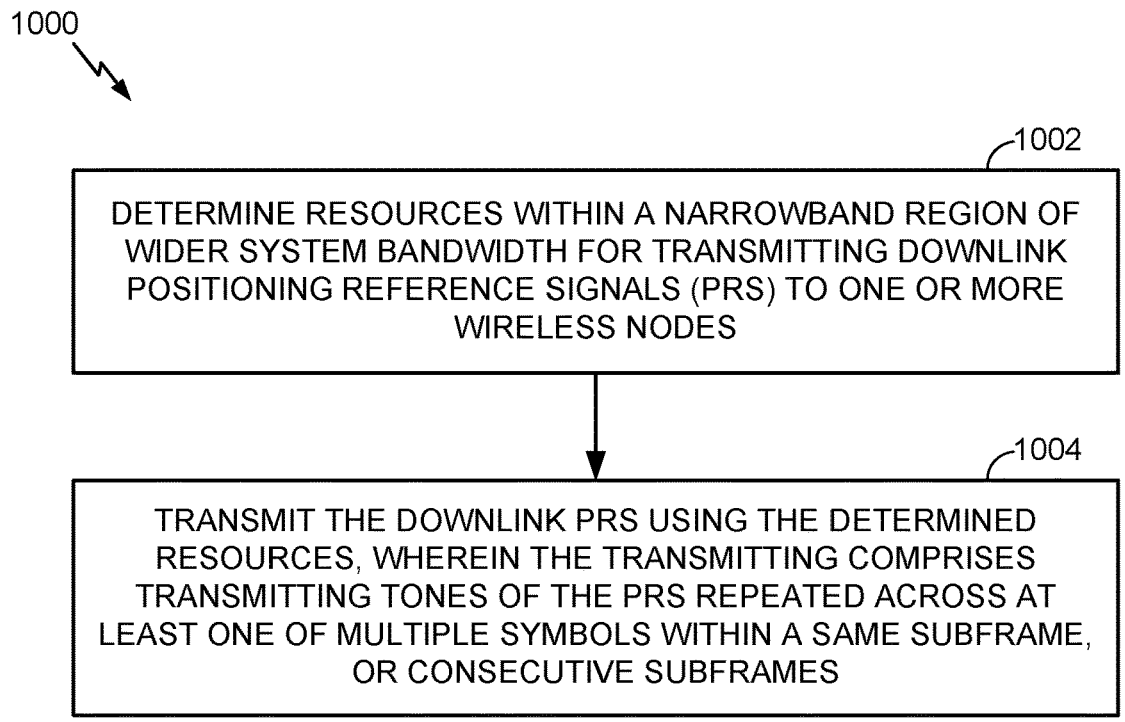
FIG. 10 illustrates example operations for downlink-based narrowband PRS that may be performed by a BS, in accordance with certain aspects of the present disclosure.
Figure 10A:
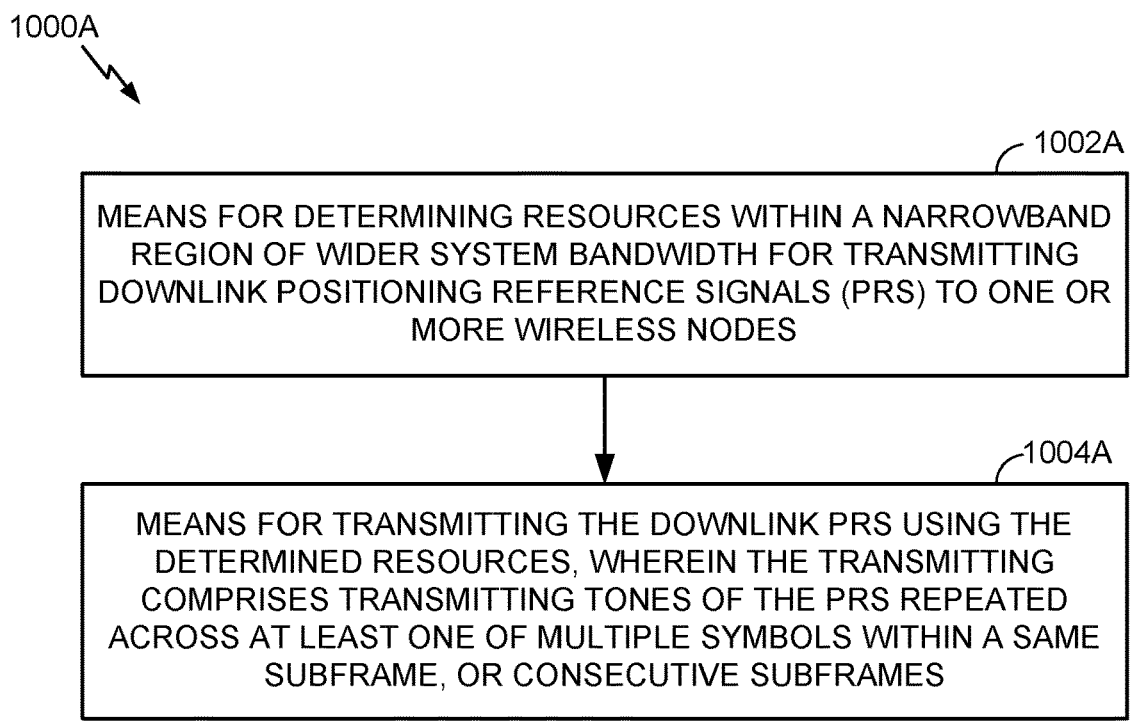
FIG. 10A illustrates example means capable of performing the operations shown in FIG. 10.

For example, FIG. 10 illustrates example operations 1000 for downlink-based narrowband PRS that may be performed by a BS, in accordance with certain aspects of the present disclosure. The operations 1000 begin, at 1002, by determining resources within a narrowband region of wider system bandwidth for transmitting downlink positioning reference signals (PRS) to one or more wireless nodes. At 1004, the BS transmits the downlink PRS using the determined resources, wherein the transmitting comprises transmitting tones of the PRS repeated across at least one of: multiple symbols within a same subframe, or multiple consecutive subframes.

Figure 11:
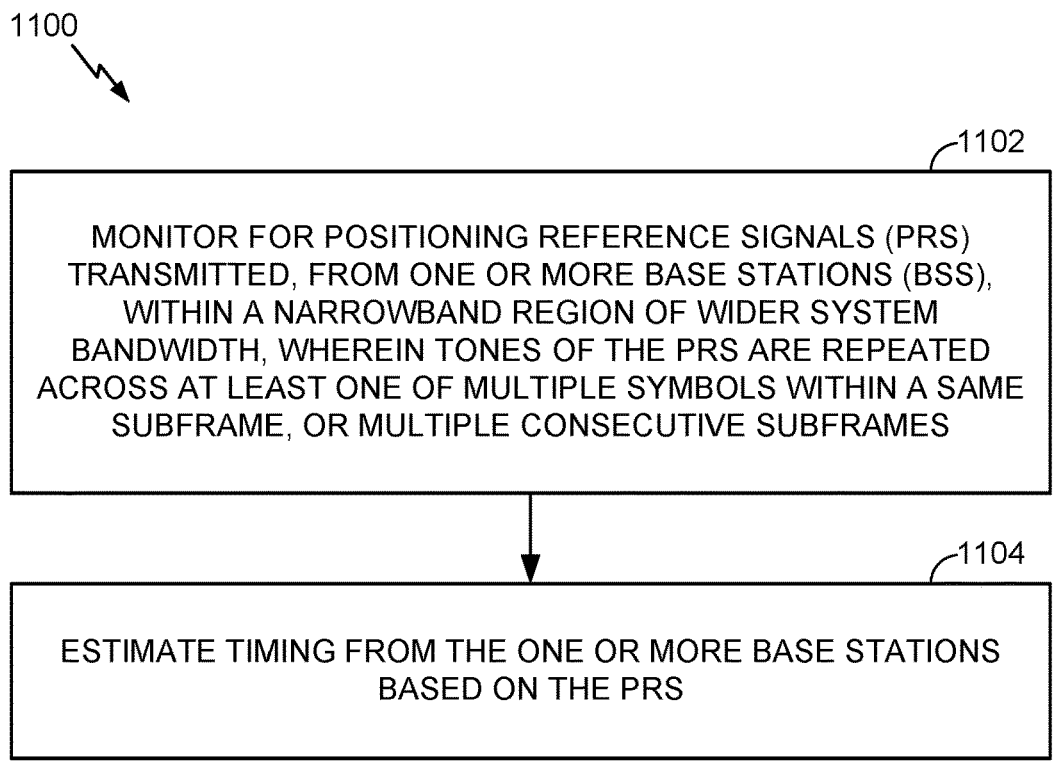
FIG. 11 illustrates example operations for downlink-based narrowband PRS that may be performed by a wireless node, in accordance with certain aspects of the present disclosure.
Figure 11A:
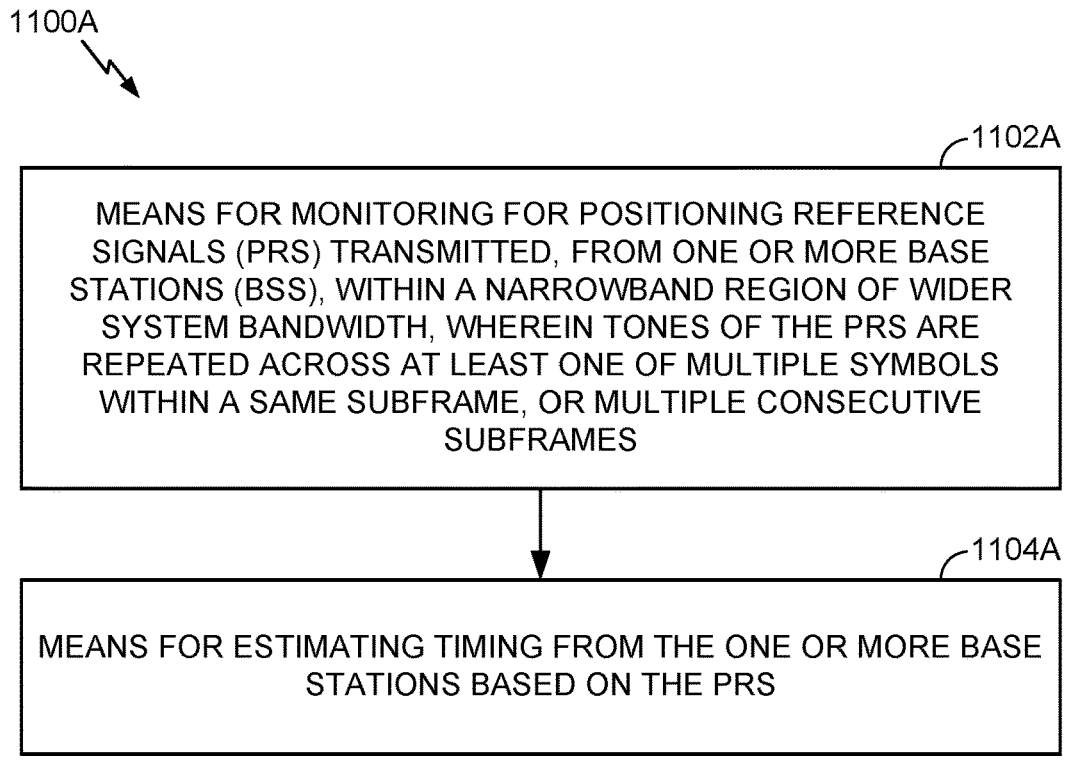
FIG. 11A illustrates example means capable of performing the operations shown in FIG. 11.

FIG. 11 illustrates example operations 1100 for downlink-based narrowband PRS that may be performed by a wireless node and may be considered complementary to operations 1000 of FIG. 10. For example, operations 1100 may be performed by a UE monitoring the DL PRS transmitted in FIG. 10. Operations 1100 begin, at 1102, by monitoring for positioning reference signals (PRS) transmitted, from one or more base stations (BSs), within a narrowband region of wider system bandwidth, wherein tones of the PRS are repeated across at least one of: multiple symbols within a same subframe, or multiple consecutive subframes. At 1104, the wireless node estimates timing from the one or more base stations based on the PRS.

Figure 12:
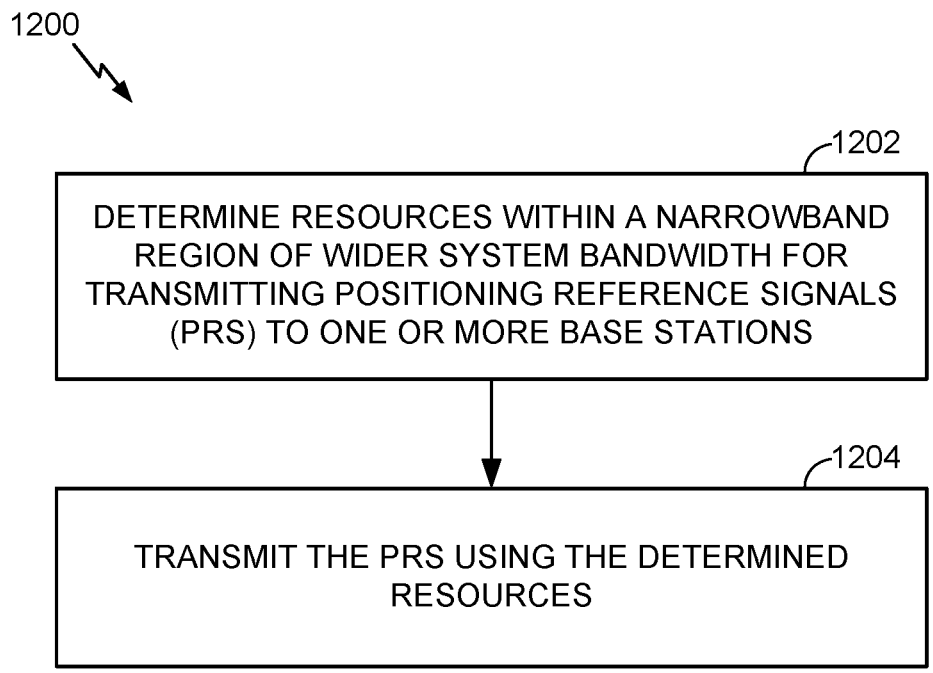
FIG. 12 illustrates example operations for uplink-based narrowband PRS that may be performed by a wireless node, in accordance with certain aspects of the present disclosure.
Figure 12A:
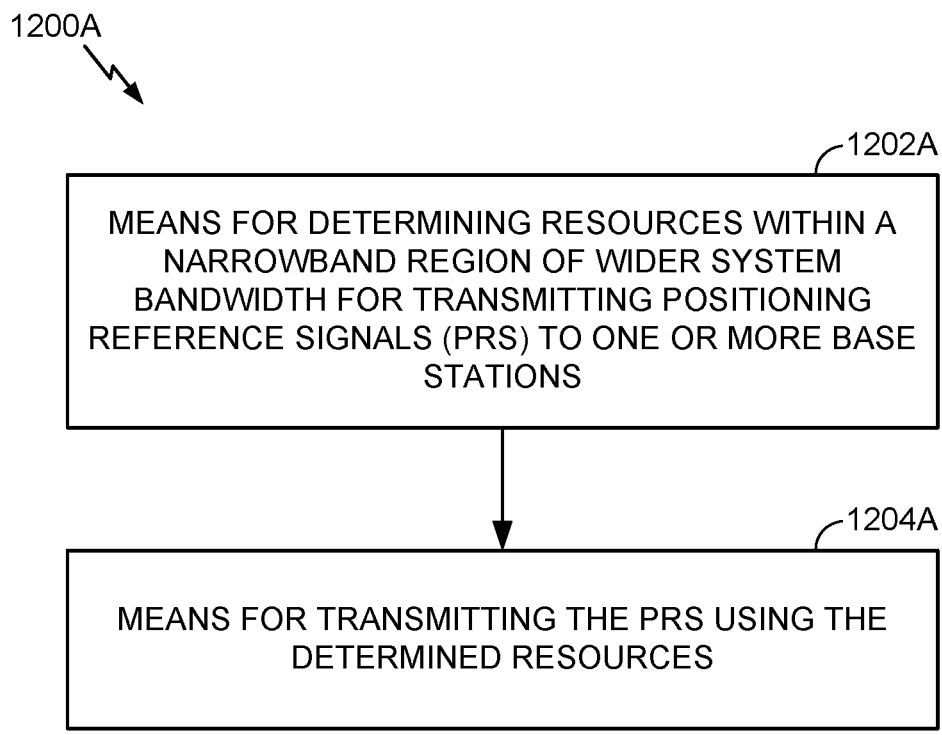
FIG. 12A illustrates example means capable of performing the operations shown in FIG. 12.

FIG. 12 illustrates example operations 1200 for uplink-based narrowband PRS that may be performed by a wireless node, in accordance with certain aspects of the present disclosure. The operations 1200 begin, at 1202, by determining resources within a narrowband region of wider system bandwidth for transmitting positioning reference signals (PRS) to one or more base stations. At 1204, the wireless node transmits the PRS using the determined resources.

Figure 13:
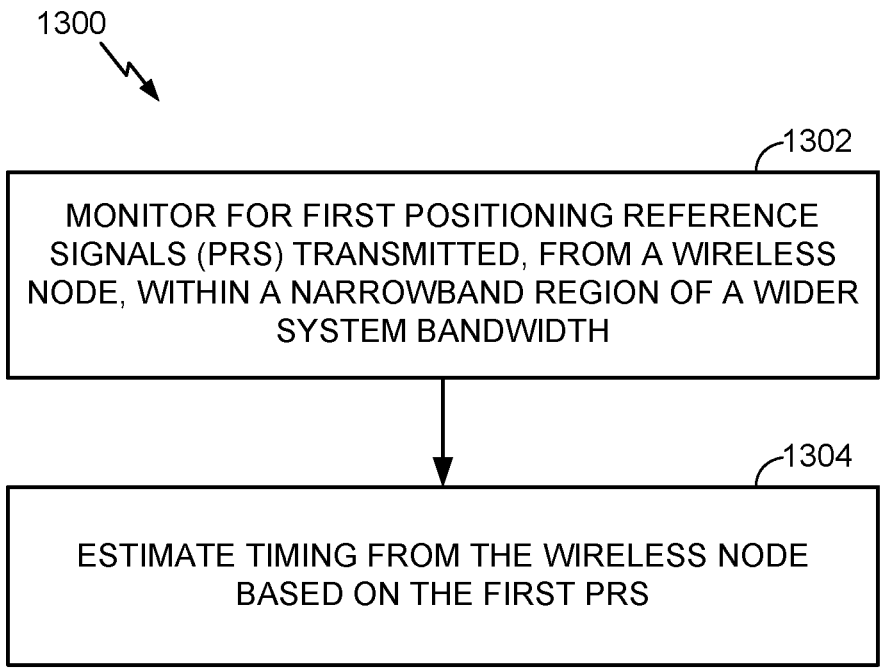
FIG. 13 illustrates example operations for uplink-based narrowband PRS that may be performed by a BS, in accordance with certain aspects of the present disclosure.
Figure 13A:
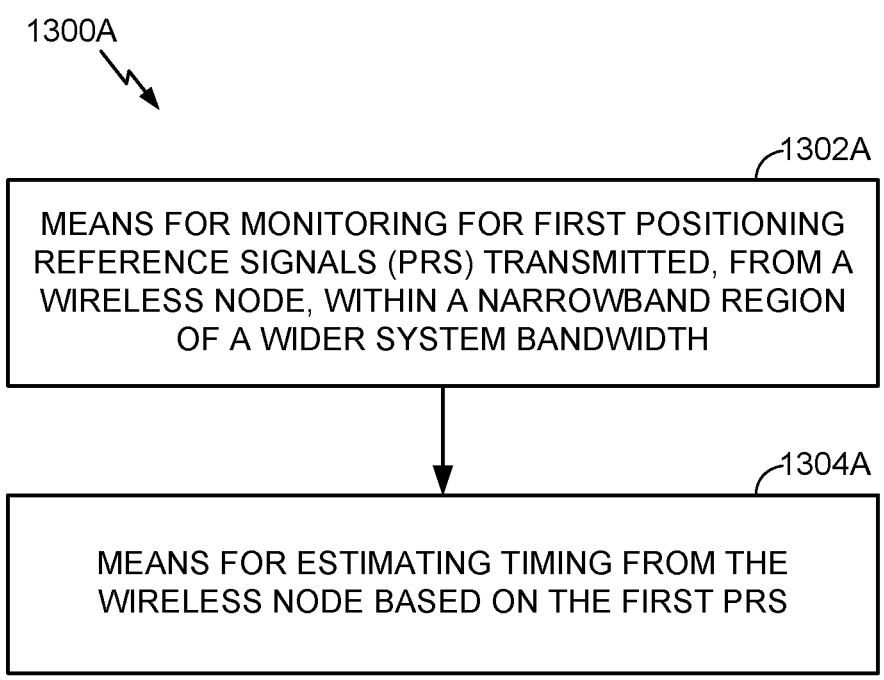
FIG. 13A illustrates example means capable of performing the operations shown in FIG. 13.

FIG. 13 illustrates example operations 1300 for uplink-based narrowband PRS that may be performed by a BS and may be considered complementary to operations 1200 of FIG. 12. The operations 1300 begin, at 1302, by monitoring for first positioning reference signals (PRS) transmitted, from a wireless node, within a narrowband region of a wider system bandwidth. At 1304, the BS estimates timing from the wireless node based on the first PRS.

Figure 14:
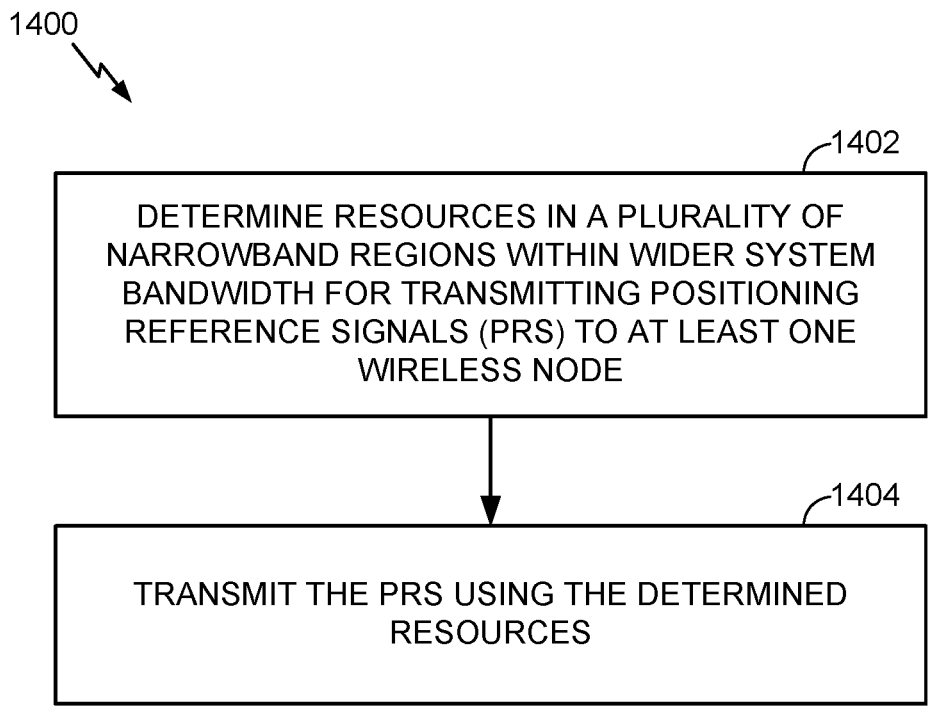
FIG. 14 illustrates example operations for downlink-based PRS across multiple narrowbands that may be performed by a BS, in accordance with certain aspects of the present disclosure.
Figure 14A:
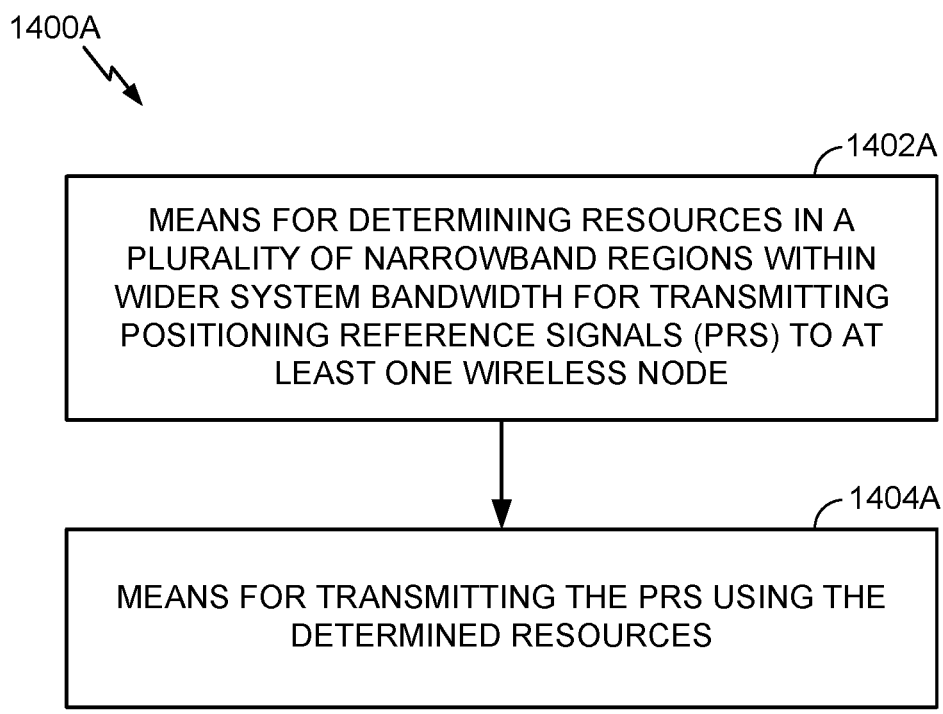
FIG. 14A illustrates example means capable of performing the operations shown in FIG. 14.

FIG. 14 illustrates example operations 1400 for downlink-based PRS across multiple narrowbands that may be performed by a BS, in accordance with certain aspects of the present disclosure. The operations 1400 begin, at 1402, by determining resources in a plurality of narrowband regions within wider system bandwidth for transmitting positioning reference signals (PRS) to at least one wireless node. At 1402, the BS transmits the PRS using the determined resources.

Figure 15:
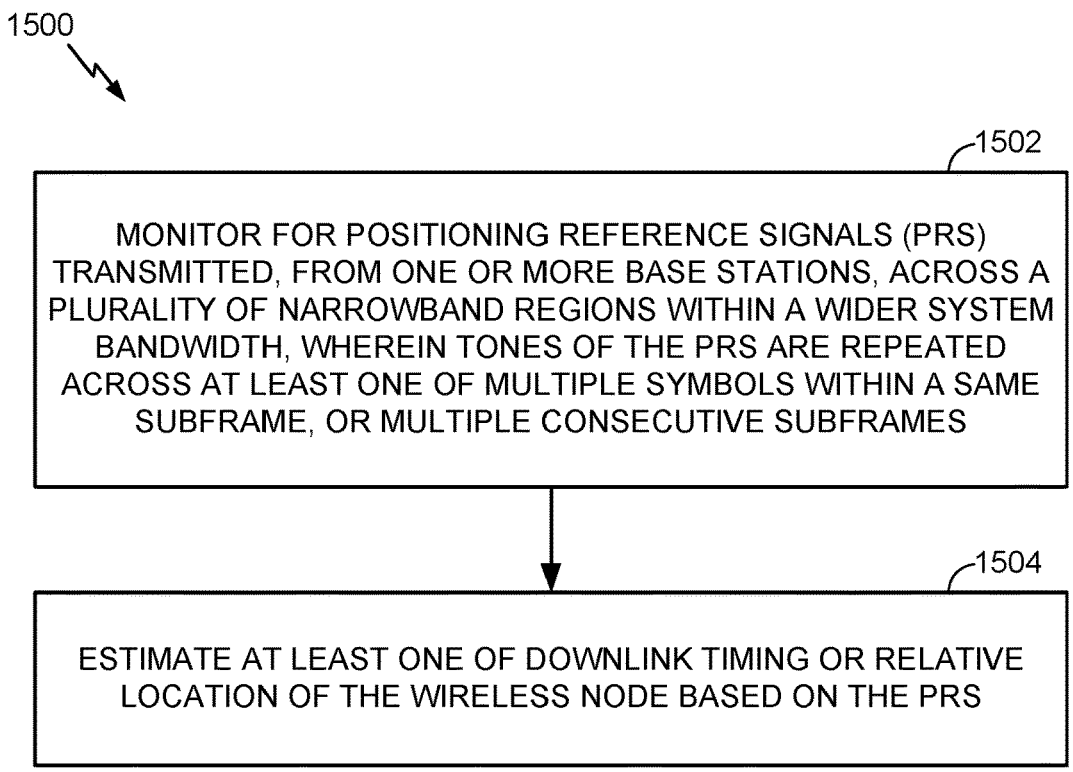
FIG. 15 illustrates example operations for downlink-based narrowband PRS across multiple narrowbands that may be performed by a wireless node, in accordance with certain aspects of the present disclosure.
Figure 15A:
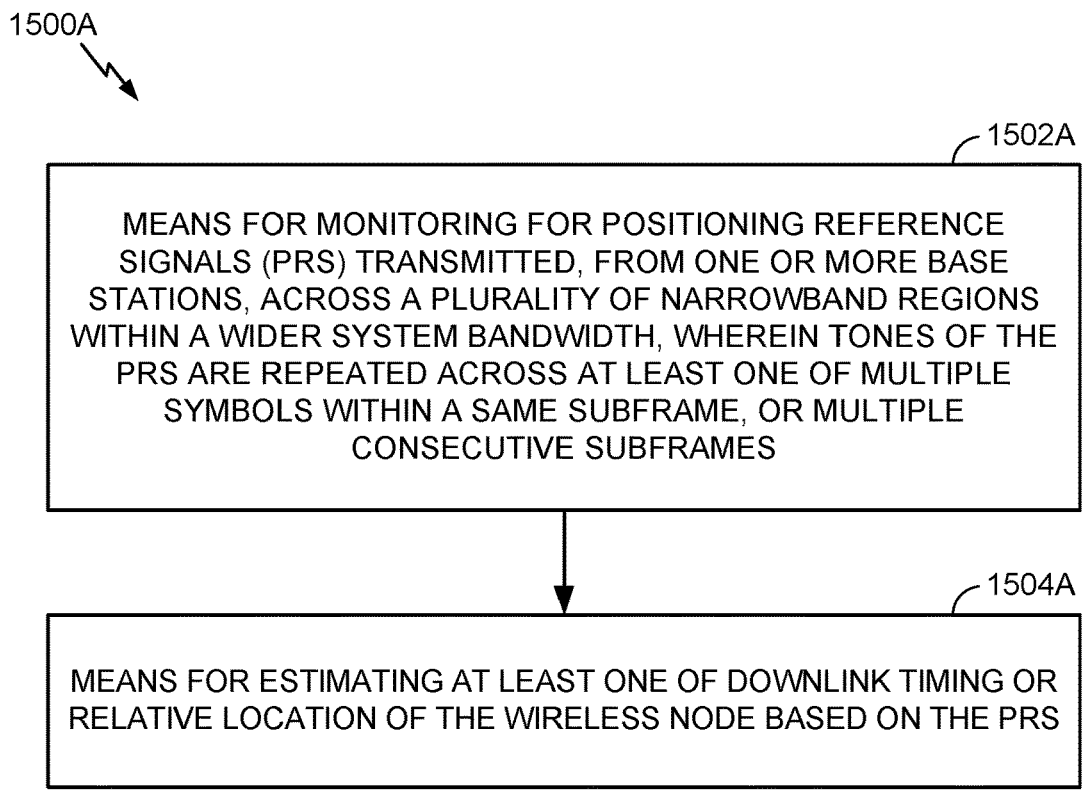
FIG. 15A illustrates example means capable of performing the operations shown in FIG. 15.

FIG. 15 illustrates example operations 1500 for downlink-based narrowband PRS across multiple narrowbands that may be performed by a wireless node and may be considered complementary to operations 1400 of FIG. 14. The operations 1500 begin, at 1502, by monitoring for positioning reference signals (PRS) transmitted, from one or more base stations, across a plurality of narrowband regions within a wider system bandwidth, wherein tones of the PRS are repeated across at least one of: multiple symbols within a same subframe, or multiple consecutive subframes. At 1504, the wireless node estimates at least one of downlink timing or relative location of the wireless node based on the PRS.

Figure 16:
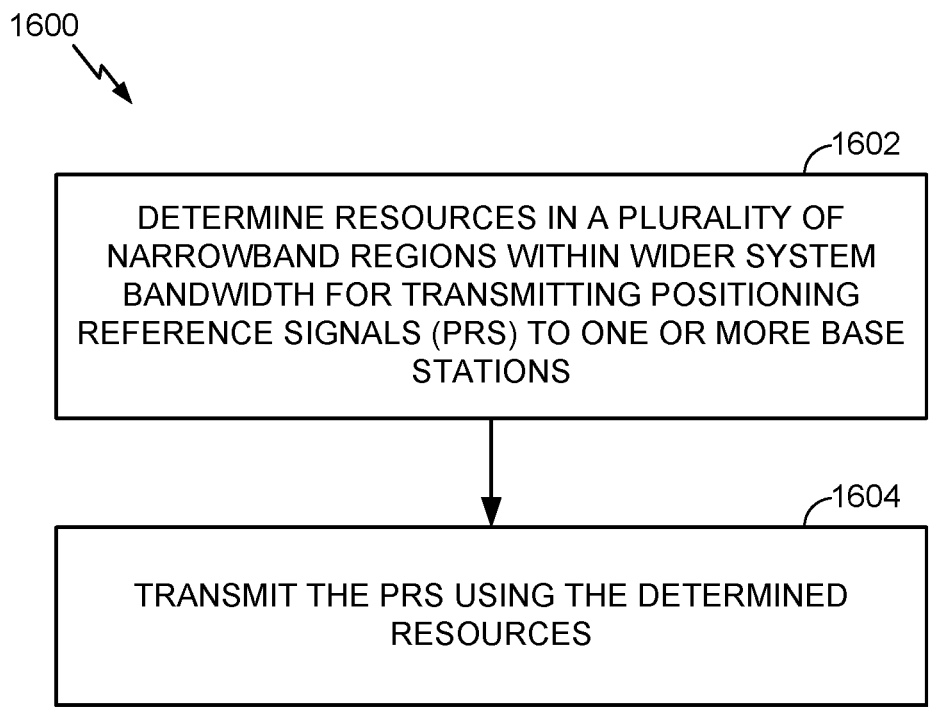
FIG. 16 illustrates example operations for uplink-based narrowband PRS across multiple narrowbands that may be performed by a wireless node, in accordance with certain aspects of the present disclosure.
Figure 16A:
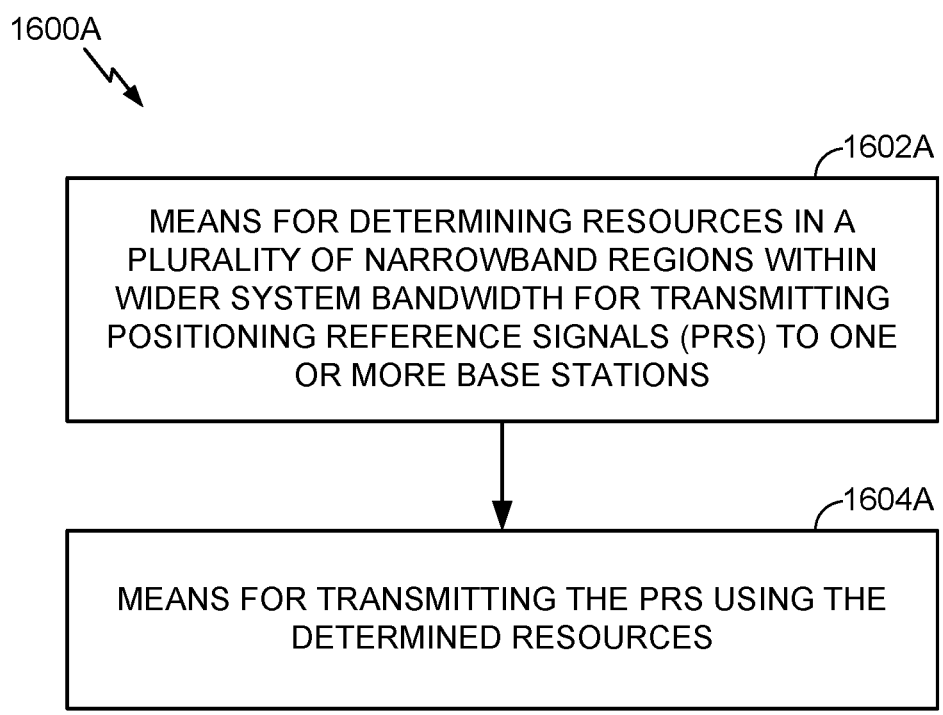
FIG. 16A illustrates example means capable of performing the operations shown in FIG. 16.

FIG. 16 illustrates example operations 1600 for uplink-based narrowband PRS across multiple narrowbands that may be performed by a wireless node, in accordance with certain aspects of the present disclosure. The operations 1600 begin, at 1602, by determining resources in a plurality of narrowband regions within wider system bandwidth for transmitting positioning reference signals (PRS) to one or more base stations. At 1604, the wireless node transmits the PRS using the determined resources.

Figure 17:
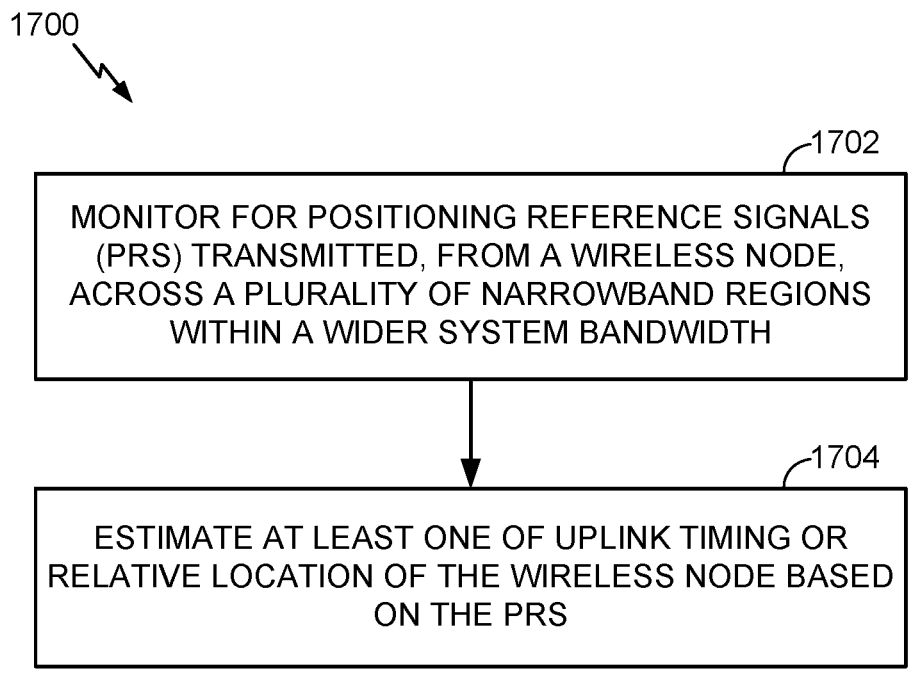
FIG. 17 illustrates example operations for uplink-based narrowband PRS across multiple narrowbands that may be performed by a BS, in accordance with certain aspects of the present disclosure.
Figure 17A:
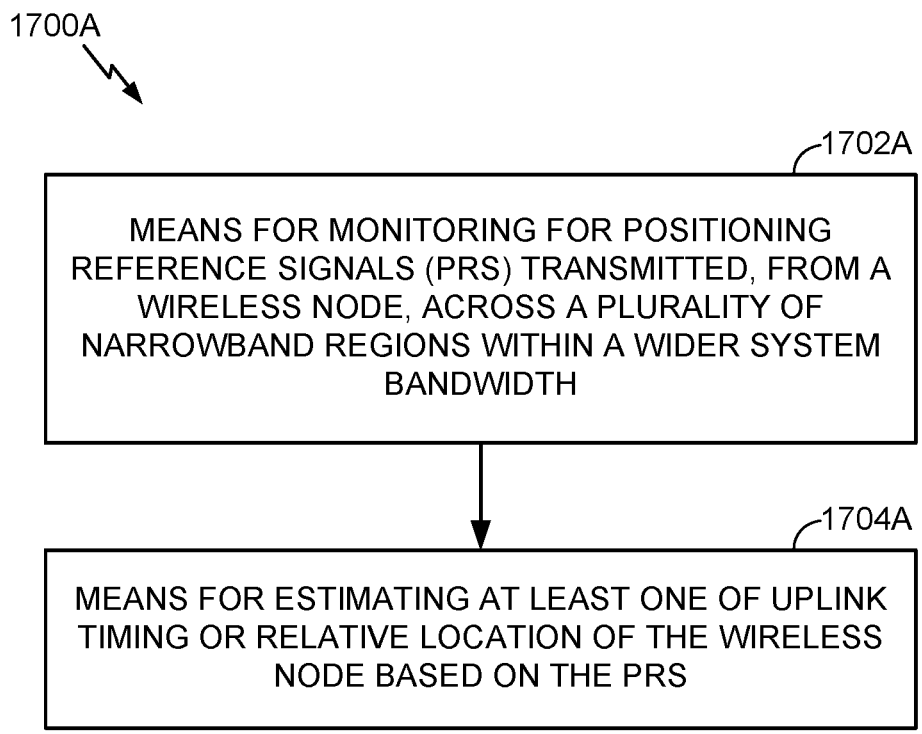
FIG. 17A illustrates example means capable of performing the operations shown in FIG. 17.

FIG. 17 illustrates example operations 1700 for uplink-based narrowband PRS across multiple narrowbands that may be performed by a BS and maybe complementary to operations 1600 of FIG. 16, in accordance with certain aspects of the present disclosure. The operations 1700 begin, at 1702, by monitoring for positioning reference signals (PRS) transmitted, from a wireless node, across a plurality of narrowband regions within a wider system bandwidth. At 1704, the BS estimates at least one of uplink timing or relative location of the wireless node based on the PRS.

As described above, the DL-based and UL-based PRS techniques presented herein may help facilitate positioning procedures in systems deploying narrowband devices, such as NB-IoT devices.

As used herein, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. As used herein, reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The steps of a method or algorithm described in connection with the disclosure herein may be embodied directly in hardware, in a software module executed by a processor, or in a combination of the two. Software shall be construed broadly to mean instructions, data, code, or any combination thereof, whether referred to as software, firmware, middleware, code, microcode, hardware description language, machine language, or otherwise. A software module may reside in RAM memory, flash memory, ROM memory, EPROM memory, EEPROM memory, PCM (phase change memory), registers, hard disk, a removable disk, a CD-ROM or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. Generally, where there are operations illustrated in Figures, those operations may have corresponding counterpart means-plus-function components with similar numbering. For example, operations 1000-1700, shown in FIGS. 10-17, have corresponding means-plus-function components 1000A-1700A, shown in FIGS. 10A-17A.

In one or more exemplary designs, the functions described may be implemented in hardware, software or combinations thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for wireless communications performed by a wireless node, comprising:
monitoring for one or more positioning reference signals (PRSs) transmitted, from one or more base stations (BSs), within a narrowband region of a wider system bandwidth, wherein tones of the one or more PRSs are repeated across at least one of:
multiple symbols within a same subframe, or
multiple consecutive subframes; and
estimating timing from the one or more base stations based on at least one of the one or more PRSs;
wherein each of the one or more PRSs is repeated across a set of the multiple symbols within the same subframe or another subframe.

2. The method of claim 1, further comprising providing feedback generated based on the estimated timing.

3. The method of claim 2, wherein the feedback comprises at least one of:
a parameter indicating the estimated timing, an estimated distance from one or more of the base stations, or a location of the wireless node.

4. The method of claim 1, wherein the PRSs or other PRSs transmitted from each BS are transmitted across multiple narrowband regions.

5. The method of claim 1, wherein one or more PRSs from each BS are transmitted within the narrowband region.

6. The method of claim 5, wherein one or more PRSs from each BS are repeated within the narrowband region.

7. The method of claim 1, wherein the tones or other tones, used to transmit the PRSs or other PRSs in different subframes, are at least one of staggered or hopped in tone index.

8. The method of claim 1, wherein each positioning reference signal of the one or more PRSs is repeated across multiple subframes.

9. The method of claim 1, wherein the one or more PRSs are transmitted with a same cyclic prefix (CP) as downlink transmissions that are transmitted using a portion of the system bandwidth larger than the narrowband portion of the system bandwidth.

10. The method of claim 1, further comprising:
receiving a PRS configuration; and
monitoring for the one or more PRSs according to the PRS configuration.

11. The method of claim 1, wherein the one or more PRSs are transmitted from multiple cells.

12. The method of claim 1, wherein the monitoring for the one or more PRSs comprises monitoring for the one or more PRSs from a base station, of the one or more base stations, only after performing a cell acquisition procedure with that base station.

13. The method of claim 1, further comprising:
estimating a downlink timing offset based on the monitored one or more PRSs; and
transmitting an uplink PRS for one or more of the base stations to use to estimate an uplink timing offset.

14. A method for wireless communications performed by a wireless node, comprising:
determining, for a given subframe, a narrowband region of a wider system bandwidth to monitor for one or more positioning reference signals (PRSs) based on a hopping pattern;
monitoring for the one or more PRSs transmitted, from one or more base stations (BSs), within the narrowband region, wherein each of the one or more PRSs from each BS is transmitted within the narrowband region, wherein the one or more PRSs from each BS are repeated within the narrowband region, and wherein tones of the one or more PRSs are repeated across at least one of:
multiple symbols within a same subframe; or
multiple consecutive subframes; and
estimating timing from the one or more base stations based on at least one of the one or more PRSs.

15. A method for wireless communications performed by a wireless node, comprising:
monitoring for one or more positioning reference signals (PRSs) transmitted, from one or more base stations (BSs), within a narrowband region of a wider system bandwidth, wherein tones of the one or more PRSs are repeated across at least one of:
multiple symbols within a same subframe; or
multiple consecutive subframes;
estimating timing from the one or more base stations based on at least one of the one or more PRSs;
estimating a downlink timing offset based on the monitored one or more PRSs, wherein the downlink timing offset is estimated from a serving BS;
transmitting an uplink PRS for one or more of the base stations to use to estimate an uplink timing offset; and
applying the downlink timing offset to monitor for one or more other PRSs transmitted from the one or more base stations, other than the serving BS.

16. A method for wireless communications performed by a base station, comprising:
determining resources within a narrowband region of a wider system bandwidth for transmitting one or more downlink positioning reference signals (PRSs) to one or more wireless nodes, wherein determining the resources comprises determining the resources for the one or more downlink PRSs to be repeated within the narrowband region; and
transmitting the one or more downlink PRSs using the determined resources, wherein the transmitting comprises transmitting tones of the one or more downlink PRSs repeated across at least one of:
multiple symbols within a same subframe, or
multiple consecutive subframes;
wherein each of the one or more downlink PRSs is repeated across a set of the multiple symbols within the same subframe or another subframe.

17. The method of claim 16, wherein the determining comprises selecting, based on a hopping pattern, different narrowband regions for different times within a same subframe.

18. The method of claim 16, wherein the determining comprises selecting, based on a hopping pattern, different narrowband regions for different subframes.

19. The method of claim 16, wherein the determining comprises selecting, based on a hopping pattern, a different single tone for transmitting the one or more downlink PRSs to different wireless nodes.

20. An apparatus for wireless communications, comprising:
a processor;
memory coupled with the processor; and
instructions stored in the memory and operable, when executed by the processor, to cause the apparatus to:
monitor for one or more positioning reference signals (PRSs) transmitted, from one or more base stations (BSs), within a narrowband region of a wider system bandwidth, wherein tones of the one or more PRSs are repeated across at least one of:
multiple symbols within a same subframe, or
multiple consecutive subframes; and
estimate timing from the one or more base stations based on at least one of the one or more PRSs;
wherein each of the one or more PRSs is repeated across a set of the multiple symbols within the same subframe or another subframe and wherein the instructions cause the processor to monitor for the one or more PRSs by monitoring across the sets of the multiple symbols.

21. The apparatus of claim 20, wherein the instructions further cause the apparatus to provide feedback generated based on the estimated timing.

22. The apparatus of claim 21, wherein the feedback comprises at least one of:
a parameter indicating the estimated timing, an estimated distance from one or more of the base stations, or a location of the apparatus.

23. The apparatus of claim 20, wherein the PRSs or other PRSs transmitted from each BS are transmitted across multiple narrowband regions and the instructions cause the apparatus to monitor for the PRS by monitoring for each of the PRSs or the other PRSs across the multiple narrowband regions.

24. The apparatus of claim 20, wherein the PRS from each BS are transmitted within the narrowband region and the instructions cause the apparatus to monitor for the PRS by monitoring for each of the PRS from each BS within the narrowband region.

25. The apparatus of claim 24, wherein PRS from each BS are repeated within the narrowband region and the instructions cause the apparatus to monitor for the PRS by monitoring for the repeated PRS from each BS within the narrowband region.

26. The apparatus of claim 20, wherein the tones or other tones, used to transmit the PRSs or other PRSs in different subframes, are at least one of staggered or hopped in tone index and the instructions cause the apparatus to monitor for the PRSs by monitoring tones in staggered or hopped in the tone indices.

27. The apparatus of claim 20, wherein each positioning reference signal of the one or more PRSs is repeated across multiple subframes and the instructions cause the apparatus to monitor for the one or more PRSs by monitoring for the one or more PRSs across multiple subframes.

28. The apparatus of claim 20, wherein the instructions further cause the apparatus to:
determine, for a given subframe, the narrowband region to monitor for the one or more PRSs based on a hopping pattern.

29. The apparatus of claim 20, wherein the one or more PRSs are transmitted with a same cyclic prefix (CP) as downlink transmissions that are transmitted using a portion of the system bandwidth larger than the narrowband portion of the system bandwidth, and the instructions cause the apparatus to monitor for the one or more PRSs by monitoring for the one or more PRSs based on the CP.

30. The apparatus of claim 20, wherein the instructions further cause the apparatus to:
receive a PRS configuration, wherein the instructions cause the apparatus to monitor for the one or more PRSs according to the PRS configuration.

31. The apparatus of claim 20, wherein the PRSs are transmitted from multiple cells and the instructions cause the apparatus to monitor for the PRSs from the multiple cells.

32. The apparatus of claim 20, wherein the instructions cause the apparatus to:
perform a cell acquisition procedure with a BS, of the one or more BSs; and
monitor for the one or more PRSs by monitoring for the one or more PRSs from the BS only after performing the cell acquisition procedure with the BS.

33. The apparatus of claim 20, wherein the instructions further cause the apparatus to:
estimate a downlink timing offset based on the monitored one or more PRSs; and transmit an uplink PRS for one or more of the base stations to use to estimate an uplink timing offset.

34. The apparatus of claim 33, wherein the instructions cause the apparatus to:
estimate the downlink timing offset from a serving BS; and
apply the downlink timing offset to monitor for one or more other PRSs transmitted from one or more base stations other than the serving BS.

35. An apparatus for wireless communications, comprising:
a processor;
memory coupled with the processor; and
instructions stored in the memory and operable, when executed by the processor, to cause the apparatus to:
determine resources within a narrowband region of a wider system bandwidth for transmitting one or more downlink positioning reference signals (PRSs) to one or more wireless nodes, wherein the instructions cause the apparatus to determine the resources by causing the apparatus to determine the resources for the one or more downlink PRSs to be repeated within the narrowband region; and
transmit the one or more downlink PRSs using the determined resources, wherein the instructions cause the apparatus to transmit by causing the apparatus to transmit tones of the one or more downlink PRSs repeated across at least one of:
multiple symbols within a same subframe, or
multiple consecutive subframes;
wherein each of the one or more downlink PRSs is repeated across a set of the multiple symbols within the same subframe or another subframe.

36. The apparatus of claim 35, wherein the instructions cause the apparatus to determine the resources by causing the apparatus to select, based on a hopping pattern, different narrowband regions for different times within a same subframe.

37. The apparatus of claim 35, wherein the instructions cause the apparatus to determine the resources by causing the apparatus to select, based on a hopping pattern, different narrowband regions for different subframes.

38. The apparatus of claim 35, wherein the instructions cause the apparatus to determine the resources by causing the apparatus to select, based on a hopping pattern, a different single tone for transmitting the one or more downlink PRSs to different wireless nodes.

39. A non-transitory computer-readable medium for wireless communications including instructions that, when executed by a processor, cause the processor to perform operations comprising:
monitoring for one or more positioning reference signals (PRSs) transmitted, from one or more base stations (BSs), within a narrowband region of a wider system bandwidth, wherein tones of the one or more PRSs are repeated across at least one of:
multiple symbols within a same subframe, or
multiple consecutive subframes; and
estimating timing from the one or more base stations based on at least one of the one or more PRSs;
wherein each of the one or more PRSs is repeated across a set of the multiple symbols within the same subframe or another subframe.

40. A non-transitory computer-readable medium for wireless communications including instructions that, when executed by a processor, cause the processor to perform operations comprising:
determining resources within a narrowband region of a wider system bandwidth for transmitting one or more downlink positioning reference signals (PRSs) to one or more wireless nodes, wherein determining the resources comprises determining the resources for the one or more downlink PRSs to be repeated within the narrowband region; and
transmitting the one or more downlink PRSs using the determined resources, wherein the transmitting comprises transmitting tones of the one or more downlink PRSs repeated across at least one of:
multiple symbols within a same subframe, or
multiple consecutive subframes;
wherein each of the one or more downlink PRSs is repeated across a set of the multiple symbols within the same subframe or another subframe.

* * * * *